US009502737B2

(12) United States Patent
Bradwell et al.

(10) Patent No.: US 9,502,737 B2
(45) Date of Patent: Nov. 22, 2016

(54) VOLTAGE-ENHANCED ENERGY STORAGE DEVICES

(71) Applicant: Ambri Inc., Cambridge, MA (US)

(72) Inventors: David J. Bradwell, Arlington, MA (US); Xingwen Yu, San Marcos, TX (US); Greg A. Thompson, Arlington, MA (US)

(73) Assignee: Ambri Inc., Cambridge, MA (US)

( * ) Notice: Subject to any disclaimer, the term of this patent is extended or adjusted under 35 U.S.C. 154(b) by 0 days.

(21) Appl. No.: 14/286,369

(22) Filed: May 23, 2014

(65) Prior Publication Data
US 2015/0015210 A1   Jan. 15, 2015

Related U.S. Application Data

(60) Provisional application No. 61/826,965, filed on May 23, 2013, provisional application No. 61/885,617, filed on Oct. 2, 2013, provisional application No. 61/925,817, filed on Jan. 10, 2014.

(51) Int. Cl.
| *H02J 7/00* | (2006.01) |
| *H01M 10/39* | (2006.01) |
| *H01M 4/38* | (2006.01) |
| *H01M 4/42* | (2006.01) |
| *H01M 4/44* | (2006.01) |

(52) U.S. Cl.
CPC ............. *H01M 10/399* (2013.01); *H01M 4/38* (2013.01); *H01M 4/387* (2013.01); *H01M 4/42* (2013.01); *H01M 4/44* (2013.01); *H02J 7/0013* (2013.01); *H02J 7/0052* (2013.01); *H01M 2300/0054* (2013.01); *H02J 7/007* (2013.01)

(58) Field of Classification Search
CPC ....... Y02E 60/12; H02J 7/0068; H02J 7/022; H02J 7/0073; H01M 10/44
USPC .......................................................... 320/137
See application file for complete search history.

(56) References Cited

U.S. PATENT DOCUMENTS

| 2,587,443 | A | 2/1952 | Crabtree |
| 3,057,946 | A | 10/1962 | Eidensohn |
| 3,238,437 | A | 3/1966 | Foster et al. |
| 3,245,836 | A | 4/1966 | Bernard |
| 3,419,432 | A | 12/1968 | Hesson |
| 3,488,221 | A | 1/1970 | Shimotake et al. |
| 3,507,703 | A | 4/1970 | Heredy |
| 3,535,214 | A | 10/1970 | Winand |
| 3,607,405 | A | 9/1971 | Christopher |
| 3,607,407 | A | 9/1971 | Adams |
| 3,635,765 | A | 1/1972 | Greenberg |
| 3,663,295 | A | 5/1972 | Baker |
| 3,716,409 | A | 2/1973 | Cairns et al. |
| 3,770,506 | A | 11/1973 | Rightmire et al. |
| 3,775,181 | A | 11/1973 | Ryerson |
| 3,833,420 | A | 9/1974 | Will |
| 3,833,421 | A | 9/1974 | Rubischko et al. |
| 3,833,422 | A | 9/1974 | Will et al. |
| 3,870,561 | A | 3/1975 | Charbonnier et al. |
| 3,877,984 | A | 4/1975 | Werth |
| 3,878,296 | A | 4/1975 | Vine et al. |
| 3,884,715 | A | 5/1975 | Gay et al. |
| 3,887,396 | A | 6/1975 | Walsh et al. |
| 3,898,096 | A | 8/1975 | Heredy et al. |
| 3,907,589 | A | 9/1975 | Gay et al. |
| 3,915,742 | A | 10/1975 | Battles et al. |
| 3,926,673 | A | 12/1975 | Saridakis |
| 3,930,888 | A | 1/1976 | Bowser et al. |
| 3,933,521 | A | 1/1976 | Vissers et al. |
| 3,941,612 | A | 3/1976 | Steunenberg et al. |
| 3,947,291 | A | 3/1976 | Yao et al. |
| 3,959,012 | A | 5/1976 | Liang et al. |
| 3,960,594 | A | 6/1976 | Fritz et al. |
| 3,969,139 | A | 7/1976 | Lai |
| 3,980,495 | A | 9/1976 | Roche et al. |
| 3,988,164 | A | 10/1976 | Liang et al. |
| 4,002,807 | A | 1/1977 | Ludwig |
| 4,011,374 | A | 3/1977 | Kaun |

(Continued)

FOREIGN PATENT DOCUMENTS

| CH | 703320 B1 | 12/2011 |
| CN | 1429417 A | 7/2003 |

(Continued)

OTHER PUBLICATIONS

International search report and written opinion dated Jan. 22, 2015 for PCT Application No. US2014/061266.
International search report and written opinion dated Jan. 29, 2015 for PCT Application No. US2014/060979.
International search report and written opinion dated Feb. 13, 2015 for PCT Application No. US2014/063222.
U.S. Appl. No. 14/687,838, filed Apr. 15, 2015, Bradwell et al.
U.S. Appl. No. 14/688,179, filed Apr. 16, 2015, Bradwell et al.
U.S. Appl. No. 14/688,214, filed Apr. 16, 2015, Bradwell et al.
Biswas, et al. Towards Implementation of Smart Grid: An Updated Review on Electrical Energy Storage Systems. Smart Grid and Renewable Energy. 2013; 4:122-132.
GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.

(Continued)

*Primary Examiner* — Arun Williams
(74) *Attorney, Agent, or Firm* — Wilson Sonsini Goodrich & Rosati

(57) ABSTRACT

The present disclosure provides an energy storage device comprising at least one electrochemical cell comprising a negative current collector, a negative electrode in electrical communication with the negative current collector, an electrolyte in electrical communication with the negative electrode, a positive electrode in electrical communication with the electrolyte and a positive current collector in electrical communication with the positive electrode. The negative electrode comprises an alkali metal. Upon discharge, the electrolyte provides charged species of the alkali metal. The positive electrode can include a Group IIIA, IVA, VA and VIA of the periodic table of the elements, or a transition metal (e.g., Group 12 element).

42 Claims, 12 Drawing Sheets

(56) References Cited

U.S. PATENT DOCUMENTS

| | | |
|---|---|---|
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Weddigen et al. |
| 4,287,268 A | 9/1981 | Coetzer |
| 4,287,269 A | 9/1981 | Coetzer et al. |
| 4,299,890 A | 11/1981 | Rea et al. |
| 4,338,380 A | 7/1982 | Erickson et al. |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco |
| H816 H | 9/1990 | Carder et al. |
| 4,954,403 A | 9/1990 | Plichta et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,039,351 A | 8/1991 | Cooper et al. |
| 5,139,895 A | 8/1992 | Roy et al. |
| 5,185,068 A | 2/1993 | Sadoway |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |
| 5,491,037 A | 2/1996 | Kawakami et al. |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | Mackenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,856,041 A | 1/1999 | Inoue et al. |
| 5,874,183 A | 2/1999 | Uematsu |
| 5,972,533 A | 10/1999 | Coetzer et al. |
| 5,982,609 A | 11/1999 | Evans |
| 6,007,943 A | 12/1999 | Coetzer |
| PP11,374 P | 5/2000 | Leue |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,517,605 B1 | 2/2003 | Bates et al. |
| 6,548,212 B1 | 4/2003 | Heider et al. |
| 6,549,423 B1 | 4/2003 | Brodnick et al. |
| 6,558,525 B1 | 5/2003 | Bradford et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,568,537 B2 | 8/2009 | King |

(56) References Cited

U.S. PATENT DOCUMENTS

| | | | |
|---|---|---|---|
| 7,603,144 B2 | 10/2009 | Jenson et al. | |
| 7,612,537 B2 | 11/2009 | Wynne et al. | |
| 7,632,604 B2 | 12/2009 | Iacovangelo et al. | |
| 7,678,484 B2 | 3/2010 | Tao et al. | |
| 7,776,190 B2 | 8/2010 | Hiltmann et al. | |
| 7,776,191 B2 | 8/2010 | Hiltmann et al. | |
| 7,776,478 B2 | 8/2010 | Klaassen | |
| 7,808,131 B2 | 10/2010 | Hurst et al. | |
| 7,877,120 B2 | 1/2011 | Jacobs et al. | |
| 7,931,989 B2 | 4/2011 | Klaassen | |
| 7,939,205 B2 | 5/2011 | Klaassen | |
| 7,943,270 B2 | 5/2011 | Blake et al. | |
| 8,044,508 B2 | 10/2011 | Jenson et al. | |
| 8,080,326 B2 | 12/2011 | Chan et al. | |
| 8,101,293 B2 | 1/2012 | Chan et al. | |
| 8,110,301 B2 | 2/2012 | Iacovangelo et al. | |
| 8,142,569 B2 | 3/2012 | Kalynushkin et al. | |
| 8,178,231 B2 | 5/2012 | Soloveichik et al. | |
| 8,202,641 B2 | 6/2012 | Winter et al. | |
| 8,219,140 B2 | 7/2012 | Jacobs et al. | |
| 8,221,912 B2 | 7/2012 | Fujiwara | |
| 8,236,440 B2 | 8/2012 | Bendert | |
| 8,237,407 B2 | 8/2012 | Hurst et al. | |
| 8,268,471 B2 | 9/2012 | Sadoway et al. | |
| 8,281,877 B2 | 10/2012 | Shahin et al. | |
| 8,298,701 B2 | 10/2012 | Whitacre et al. | |
| 8,306,671 B1 | 11/2012 | Marcus | |
| 8,311,681 B1 | 11/2012 | Marcus | |
| 8,313,719 B2 * | 11/2012 | Barker | C01B 25/45 423/302 |
| 8,323,816 B2 | 12/2012 | Bradwell et al. | |
| 8,329,336 B2 | 12/2012 | Soloveichik et al. | |
| 8,334,053 B2 | 12/2012 | Shapiro et al. | |
| 8,343,646 B1 | 1/2013 | Wilkins et al. | |
| 8,409,744 B2 | 4/2013 | Ijaz et al. | |
| 8,436,489 B2 | 5/2013 | Stahlkopf et al. | |
| 8,457,800 B2 | 6/2013 | Marcus | |
| 8,460,814 B2 | 6/2013 | Deane et al. | |
| 8,471,520 B2 | 6/2013 | Coe et al. | |
| 8,475,954 B2 | 7/2013 | Ijaz et al. | |
| 8,504,214 B2 | 8/2013 | Genc et al. | |
| 8,537,581 B2 | 9/2013 | Wagoner et al. | |
| 8,539,763 B2 | 9/2013 | McBride et al. | |
| 8,568,915 B2 | 10/2013 | Fuhr et al. | |
| 8,642,201 B2 | 2/2014 | Cheng et al. | |
| 8,643,500 B2 | 2/2014 | Lee et al. | |
| 8,652,672 B2 | 2/2014 | Whitacre et al. | |
| 8,722,226 B2 | 5/2014 | Chiang et al. | |
| 8,764,962 B2 | 7/2014 | Allanore et al. | |
| 8,766,642 B2 | 7/2014 | Bogdan et al. | |
| 8,806,866 B2 | 8/2014 | McBride et al. | |
| 8,815,445 B2 | 8/2014 | Sugiura et al. | |
| 9,000,713 B2 | 4/2015 | Boysen et al. | |
| 9,076,996 B2 | 7/2015 | Bradwell et al. | |
| 9,153,803 B2 | 10/2015 | Chung et al. | |
| 9,312,522 B2 | 4/2016 | Bradwell et al. | |
| 2002/0009649 A1 * | 1/2002 | Sato | H01M 10/052 429/306 |
| 2002/0064704 A1 | 5/2002 | Thackeray et al. | |
| 2003/0008212 A1 * | 1/2003 | Akashi | H01M 4/13 429/231.9 |
| 2003/0044686 A1 | 3/2003 | Bushong et al. | |
| 2003/0186111 A1 | 10/2003 | Tamakoshi | |
| 2003/0196908 A1 | 10/2003 | Brown | |
| 2003/0207161 A1 * | 11/2003 | Rusta-Sallehy | H01M 8/065 429/410 |
| 2004/0076885 A1 * | 4/2004 | Sato | H01M 10/052 429/303 |
| 2004/0229116 A1 | 11/2004 | Malinski et al. | |
| 2004/0258953 A1 * | 12/2004 | Kido | C08F 226/06 428/690 |
| 2005/0079411 A1 | 4/2005 | Kairawicz et al. | |
| 2005/0237029 A1 | 10/2005 | Takezawa et al. | |
| 2006/0127735 A1 | 6/2006 | Sabin et al. | |
| 2006/0151333 A1 | 7/2006 | Banek | |
| 2007/0215483 A1 | 9/2007 | Johansen et al. | |
| 2007/0252556 A1 | 11/2007 | West et al. | |
| 2008/0023321 A1 | 1/2008 | Sadoway | |
| 2008/0044725 A1 | 2/2008 | Sadoway et al. | |
| 2008/0050295 A1 | 2/2008 | Uchida et al. | |
| 2008/0053838 A1 | 3/2008 | Yamaguchi et al. | |
| 2008/0118428 A1 | 5/2008 | Awano et al. | |
| 2008/0145755 A1 | 6/2008 | Iacovangelo et al. | |
| 2008/0308415 A1 | 12/2008 | Hiltmann et al. | |
| 2009/0011331 A1 | 1/2009 | Stringer et al. | |
| 2009/0014320 A1 | 1/2009 | Chiang et al. | |
| 2009/0029236 A1 | 1/2009 | Mailley et al. | |
| 2009/0162736 A1 | 6/2009 | Vallance et al. | |
| 2009/0208836 A1 | 8/2009 | Fuhr et al. | |
| 2009/0212743 A1 | 8/2009 | Hagiwara et al. | |
| 2009/0253017 A1 | 10/2009 | Larsen et al. | |
| 2009/0297892 A1 | 12/2009 | Ijaz et al. | |
| 2010/0047671 A1 | 2/2010 | Chiang et al. | |
| 2010/0058578 A1 | 3/2010 | Vallance et al. | |
| 2010/0068610 A1 | 3/2010 | Sudworth | |
| 2010/0154205 A1 | 6/2010 | Nakagawa et al. | |
| 2010/0233518 A1 * | 9/2010 | Kwon | G21H 1/00 429/7 |
| 2011/0014503 A1 | 1/2011 | Bradwell et al. | |
| 2011/0014505 A1 | 1/2011 | Bradwell et al. | |
| 2011/0027624 A1 | 2/2011 | Deane et al. | |
| 2011/0027627 A1 | 2/2011 | Deane et al. | |
| 2011/0027633 A1 | 2/2011 | Deane et al. | |
| 2011/0027637 A1 | 2/2011 | Deane et al. | |
| 2011/0027638 A1 | 2/2011 | Deane et al. | |
| 2011/0027639 A1 | 2/2011 | Deane et al. | |
| 2011/0050235 A1 | 3/2011 | Bogdan, Jr. et al. | |
| 2011/0086258 A1 | 4/2011 | Yaginuma et al. | |
| 2011/0104570 A1 | 5/2011 | Galloway et al. | |
| 2011/0111296 A1 | 5/2011 | Berdichevsky et al. | |
| 2011/0135975 A1 | 6/2011 | Fuhr et al. | |
| 2011/0177413 A1 | 7/2011 | Tao et al. | |
| 2011/0189520 A1 | 8/2011 | Carter et al. | |
| 2011/0200848 A1 | 8/2011 | Chiang et al. | |
| 2011/0262794 A1 | 10/2011 | Yoon | |
| 2012/0003508 A1 | 1/2012 | Narbonne et al. | |
| 2012/0003513 A1 | 1/2012 | Fuhr | |
| 2012/0015235 A1 | 1/2012 | Fuhr et al. | |
| 2012/0077095 A1 | 3/2012 | Roumi et al. | |
| 2012/0104990 A1 | 5/2012 | Boysen et al. | |
| 2012/0125784 A1 | 5/2012 | Berlin et al. | |
| 2012/0129056 A1 | 5/2012 | Majima et al. | |
| 2012/0146585 A1 | 6/2012 | Darcy | |
| 2012/0161083 A1 | 6/2012 | Jha et al. | |
| 2012/0183838 A1 | 7/2012 | An et al. | |
| 2012/0191262 A1 | 7/2012 | Marcus | |
| 2012/0194140 A1 | 8/2012 | Rijssenbeek et al. | |
| 2012/0196170 A1 | 8/2012 | Ijaz et al. | |
| 2012/0217032 A1 | 8/2012 | Beaupre et al. | |
| 2012/0244404 A1 | 9/2012 | Obasih et al. | |
| 2012/0244418 A1 | 9/2012 | Cheng et al. | |
| 2012/0264021 A1 | 10/2012 | Sugiura et al. | |
| 2012/0265397 A1 | 10/2012 | Aliberti et al. | |
| 2012/0282501 A1 | 11/2012 | Haynes et al. | |
| 2012/0282508 A1 | 11/2012 | Bendert | |
| 2012/0297772 A1 | 11/2012 | McBride et al. | |
| 2012/0328910 A1 | 12/2012 | Ia et al. | |
| 2013/0009602 A1 | 1/2013 | Hoff et al. | |
| 2013/0017417 A1 | 1/2013 | Whitacre et al. | |
| 2013/0022845 A1 | 1/2013 | Davis et al. | |
| 2013/0022852 A1 | 1/2013 | Chang et al. | |
| 2013/0029195 A1 | 1/2013 | Peace | |
| 2013/0045408 A1 | 2/2013 | Sadoway et al. | |
| 2013/0049466 A1 | 2/2013 | Adams | |
| 2013/0049478 A1 | 2/2013 | Wagoner et al. | |
| 2013/0055559 A1 | 3/2013 | Slocum et al. | |
| 2013/0057220 A1 | 3/2013 | Whitacre | |
| 2013/0059176 A1 | 3/2013 | Stefani et al. | |
| 2013/0059185 A1 | 3/2013 | Whitacre et al. | |
| 2013/0065122 A1 | 3/2013 | Chiang et al. | |
| 2013/0069001 A1 * | 3/2013 | Luo | C08L 81/02 252/299.5 |
| 2013/0071306 A1 | 3/2013 | Camp et al. | |
| 2013/0074485 A1 | 3/2013 | McBride et al. | |

(56) References Cited

U.S. PATENT DOCUMENTS

| | | | |
|---|---|---|---|
| 2013/0074488 A1 | 3/2013 | McBride et al. | |
| 2013/0074940 A1 | 3/2013 | McBride et al. | |
| 2013/0074941 A1 | 3/2013 | McBride et al. | |
| 2013/0074949 A1 | 3/2013 | McBride et al. | |
| 2013/0084474 A1 | 4/2013 | Mills | |
| 2013/0119937 A1 | 5/2013 | Arseneault et al. | |
| 2013/0136980 A1 | 5/2013 | Bartling | |
| 2013/0143139 A1 | 6/2013 | Tao et al. | |
| 2013/0145764 A1 | 6/2013 | McBride et al. | |
| 2013/0166085 A1 | 6/2013 | Cherian et al. | |
| 2013/0295435 A1 | 11/2013 | Vu | |
| 2014/0000251 A1 | 1/2014 | McBride et al. | |
| 2014/0038012 A1 | 2/2014 | Alimario et al. | |
| 2014/0099522 A1 | 4/2014 | Spatocco et al. | |
| 2014/0113181 A1 | 4/2014 | Bradwell et al. | |
| 2014/0162090 A1 | 6/2014 | Whitacre et al. | |
| 2014/0220428 A1* | 8/2014 | Zinck ................ | H01M 10/052 429/200 |
| 2014/0248521 A1 | 9/2014 | Chiang et al. | |
| 2014/0272481 A1 | 9/2014 | Chung et al. | |
| 2015/0004455 A1 | 1/2015 | Bradwell et al. | |
| 2015/0037670 A1* | 2/2015 | Tanaka ............... | H01M 4/40 429/215 |
| 2015/0132627 A1 | 5/2015 | Bradwell et al. | |
| 2015/0132628 A1 | 5/2015 | Bradwell et al. | |
| 2015/0214579 A1 | 7/2015 | Boysen et al. | |
| 2015/0249273 A1 | 9/2015 | Bradwell et al. | |
| 2015/0249274 A1 | 9/2015 | Bradwell et al. | |
| 2015/0303525 A1 | 10/2015 | Bradwell et al. | |
| 2015/0325821 A1 | 11/2015 | Bradwell et al. | |
| 2016/0156068 A1 | 6/2016 | Burke et al. | |
| 2016/0172714 A1 | 6/2016 | Ouchi et al. | |

FOREIGN PATENT DOCUMENTS

| | | |
|---|---|---|
| CN | 101436780 A | 5/2009 |
| CN | 101942676 A | 1/2011 |
| CN | 201809448 U | 4/2011 |
| CN | 201908137 U | 7/2011 |
| CN | 102181883 A | 9/2011 |
| CN | 102646808 A | 8/2012 |
| CN | 103001239 A | 3/2013 |
| DE | 3239964 A1 | 5/1984 |
| DE | 19618609 A1 | 11/1997 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| GB | 2062939 A | 5/1981 |
| JP | S4933815 B1 | 9/1974 |
| JP | S 55-053877 A1 | 4/1980 |
| JP | S61114664 A | 6/1986 |
| JP | H 06310171 A | 11/1994 |
| JP | 2001/115369 | 4/2001 |
| JP | 2001243994 A | 9/2001 |
| JP | 3355377 B2 | 12/2002 |
| JP | 2007-157373 A | 6/2007 |
| JP | 2010535942 A | 11/2010 |
| JP | 2011508379 A | 3/2011 |
| JP | 2012-226866 A | 11/2012 |
| KR | 10-2012-0059106 A | 6/2012 |
| WO | WO-9965642 A1 | 12/1999 |
| WO | WO 00/05774 A1 | 2/2000 |
| WO | WO 2008/045996 A2 | 4/2008 |
| WO | WO 2008/105811 A2 | 9/2008 |
| WO | WO 2008/045996 A3 | 10/2008 |
| WO | WO 2008/105811 A3 | 12/2008 |
| WO | WO 2009/046533 A1 | 4/2009 |
| WO | WO 2009/151639 A1 | 12/2009 |
| WO | WO 2010/130583 A2 | 11/2010 |
| WO | WO 2011/011056 A2 | 1/2011 |
| WO | WO 2011/014242 A1 | 2/2011 |
| WO | WO 2011/014243 A1 | 2/2011 |
| WO | WO 2011/022390 A2 | 2/2011 |
| WO | WO 2011/025574 A1 | 3/2011 |
| WO | WO 2011/047067 A2 | 4/2011 |
| WO | WO 2011/022390 A3 | 5/2011 |
| WO | WO 2011/050924 A1 | 5/2011 |
| WO | WO 2011/079548 A1 | 7/2011 |
| WO | WO 2011/082659 A1 | 7/2011 |
| WO | WO 2011/047067 A3 | 8/2011 |
| WO | WO 2011/100686 A1 | 8/2011 |
| WO | WO-2011116236 A2 | 9/2011 |
| WO | WO 2011/148347 A1 | 12/2011 |
| WO | WO 2011/153312 A2 | 12/2011 |
| WO | WO 2012/003649 A1 | 1/2012 |
| WO | WO 2012/009145 A2 | 1/2012 |
| WO | WO 2012/033692 A2 | 3/2012 |
| WO | WO 2012/040176 A1 | 3/2012 |
| WO | WO 2011/153312 A3 | 4/2012 |
| WO | WO 2012/009145 A3 | 4/2012 |
| WO | WO 2012/051790 A1 | 4/2012 |
| WO | WO 2012/033692 A3 | 6/2012 |
| WO | WO 2012/129827 A1 | 10/2012 |
| WO | WO 2012/145314 A2 | 10/2012 |
| WO | WO-2012138576 A1 | 10/2012 |
| WO | WO 2012/158751 A1 | 11/2012 |
| WO | WO 2012/158781 A2 | 11/2012 |
| WO | WO 2013/025608 A1 | 2/2013 |
| WO | WO 2013/032667 A1 | 3/2013 |
| WO | WO 2013/048704 A1 | 4/2013 |
| WO | WO 2013/052494 A1 | 4/2013 |
| WO | WO 2014/055873 A1 | 4/2014 |
| WO | WO 2014/062702 A1 | 4/2014 |
| WO | WO 2014/062706 A1 | 4/2014 |
| WO | WO 2014/140792 A2 | 9/2014 |
| WO | WO 2014/190318 A1 | 11/2014 |
| WO | WO 2015/042295 A1 | 3/2015 |
| WO | WO 2015/058010 A1 | 4/2015 |
| WO | WO 2015/058165 A1 | 4/2015 |
| WO | WO 2015/063588 A2 | 5/2015 |
| WO | WO 2015/066359 A1 | 5/2015 |

OTHER PUBLICATIONS

International preliminary report on patentability and written opinion dated Apr. 16, 2015 for PCT Application No. US2013/063472.
International preliminary report on patentability and written opinion dated Jan. 24, 2014 for PCT Application No. US2013/065086.
International preliminary report on patentability and written opinion dated Dec. 26, 2013 for PCT Application No. US2013/065092.
International preliminary report on patentability and written opinion dated Feb. 7, 2011 for PCT Application No. US2010/002035.
International preliminary report on patentability and written opinion dated Dec. 29, 2011 for PCT Application No. US2011/052316.
International preliminary report on patentability and written opinion dated Sep. 18, 2008 for PCT Application No. US2007/018168.
International search report and written opinion dated Jan. 23, 2015 for PCT Application No. PCT/US2014/056367.
Kane, et al. Electrochemical Determination of the Thermodynamic Properties of Lithium—Antimony Alloys. Journal of the Electrochemical Society, 162 (3) A421-A425 (2015).
Kelley, et al. Mixing in a liquid metal electrode. Physics of Fluids 26, Jan. 2014, 057102, pp. 1-12.
Kim, et al. Calcium—bismuth electrodes for large-scale energy storage (liquid metal batteries). Journal of Power Sources, vol. 241, Apr. 2013, pp. 239-248.
NAS Sodium Sulfur Battery Energy Storage System website, accessed Apr. 7, 2015. https://www.ngk.co.jp/nas/specs/#topto_specs.
Ning, et al. Self-healing Li—Bi liquid metal battery for grid-scale energy storage. Journal of Power Sources 275 (2015) 370-376.
Notice of allowance dated Mar. 12, 2015 for U.S. Appl. No. 12/839,130.
Notice of allowance dated Apr. 6, 2015 for U.S. Appl. No. 13/801,333.

(56) References Cited

OTHER PUBLICATIONS

Notice of allowance dated Apr. 30, 2015 for U.S. Appl. No. 13/801,333.
Spatocco, et al. Cost-based discovery for engineering solutions. pp. 1-43.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium—antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium—antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.
Chuang. Floating capacitor active charge balancing for PHEV application. Thesis. Ohio State University. 2010.
Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Jan. 24, 2012 for PCT Application No. US2010/002035.
International preliminary report on patentability and written opinion dated Mar. 26, 2013 for PCT Application No. US2011/052316.
International preliminary report on patentability and written opinion dated Feb. 17, 2009 for PCT Application No. US2007/018168.
International search report and written opnion dated Jun. 11, 2015 for PCT Application No. IB2014/002608.
Jarret, et al. Advances in the Smelting of aluminum. Metallurgical Treatises, pp. 137-157, 1981.
Kane, et al. Electrochemical Determination of the Thermodynamic Properties of Lithium—Antimony Alloys. Journal of the Electrochemical Society, 162 (3) A421-A425 (2015). Published Dec. 31, 2014.
Kelley, et al. Mixing in a liquid metal electrode. Physics of Fluids 26, 2014, 057102, pp. 1-12. Published online May 20, 2014.
Kim, et al. Calcium—bismuth electrodes for large-scale energy storage (liquid metal batteries). Journal of Power Sources, vol. 241, 2013, pp. 239-248. Available online Apr. 19, 2013.
Kim, et al. Liquid Metal Batteries: Past, Present, and Future. Chemical Reviews, vol. 113, No. 3, Mar. 13, 2013, pp. 2075-2099. Published on web Nov. 27, 2012.
Lalau, et al. Sodium—bismuth—lead low temperature liquid metal battery. Journal for Electrochemistry and Plating Technology, Jun. 2015, pp. 1-7.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Nuvation BMS A Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Ouchi, et al. Calcium—Antimony Alloys as Electrodes for Liquid Metal Batteries. Journal of the Electrochemical Society. 2014; 161(12):A1898-A1904. Published Sep. 9, 2014.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.

(56) References Cited

OTHER PUBLICATIONS

Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Spatocco, et al. Cost-based discovery for engineering solutions. pp. 1-43. Adv. in Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium—antimony—lead liquid metal battery for grid-level energy storage. Nature. Oct. 16, 2014;514(7522):348-50. doi: 10.1038/nature13700. Epub Sep. 21, 2014.
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
U.S. Appl. No. 14/178,806, filed Feb. 12, 2014, Bradwell et al.
U.S. Appl. No. 14/536,549, filed Nov. 7, 2014, Bradwell et al.
U.S. Appl. No. 14/536,563, filed Nov. 7, 2014, Bradwell et al.
Advisory Action Before Filing of Appeal Brief dated May 10, 2012 for U.S. Appl. No. 12/839,130.
Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Atthey. A Mathematical Model for Fluid Flow in a Weld Pool at High Currents. J. Fluid Mech. 1980; 98(4):787-801.
Bradwell, et al. Magnesium—antimony liquid metal battery for stationary energy storage. J Am Chem Soc. Feb. 1, 2012;134(4):1895-7. doi: 10.1021/ja209759s. Epub Jan. 18, 2012.
Bradwell. Liquid metal batteries : ambipolar electrolysis and alkaline earth electroalloying cells. Massachusetts Institute of Technology. Dept. of Materials Science and Engineering. 2011.
Bradwell. Technical and economic feasibility of a high-temperature self-assembling battery. Department of Material Science and Engineering. MIT. Thesis final copy. Aug. 2006.
Cairns, et al. Galvanic Cells with Fused-Salt Electrolytes. AEC Research and Development. 44 pages, Nov. 1967.
Cairns, et al. High Temperature Batteries Research in high-temperature electrochemistry reveals compact, powerful energy-storage cells. Science. Jun. 1969; 164(3886):1347-1355.
Chuang. Floating capacitor active charge balancing for PHEV application. Master Thesis. Ohio State University. 2010.
Cubicciotti, et al. Metal-Salt Interactions at High Temperatures: The Solubilities of Some alkaline Earth Metals in their Halides. J. Am. Chem. Soc. 1949; 71(6):21492153.
Dworkin, et al. The Electrical Conductivity of Solutions of Metals in their Molten Halides. VIII. alkaline Earth Metal Systems. J. Phys. Chem. Jul. 1966; 70(7):2384.
European search report and search opinion dated Feb. 12, 2014 for EP Application No. 13196841.4.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Avallable at http://www.geenergystorage.com/images/ge/PDF/DurathonGridE620ModuleSpecSheet.pdf. Accessed on Oct. 18, 2012.
Hall-heroult cell. Wikimedia Commons. Dec. 31, 2008. Accessed Nov. 10, 2014. http://commons.wikimedia.org/wiki/File:Hall-heroult-kk-2008-12-31.png.
International search report and written opinion dated Jan. 24, 2014 for PCT/US2013/065086.
International search report and written opinion dated Jan. 27, 2014 for PCT Application No. US2013/063472.
International search report and written opinion dated Feb. 7, 2011 for PCT/US2010/002035.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report dated Oct. 15, 2014 for PCT Application No. IB2014/000617.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kim, et al. Liquid Metal Batteries: Past, Present, and Future. Chemical Reviews, vol. 113, No. 3, Mar. 13, 2013, pp. 2075-2099.
Merriam-Webster's Medical Dictionary Website. http://merriam-webster.com/medical/room%20temperature. Apr. 2009.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Jul. 13, 2012 for U.S. Appl. No. 11/839,413.
Notice of allowance dated Aug. 2, 2012 for U.S. Appl. No. 12/505,937.
Office action dated Jan. 5, 2012 for U.S. Appl. No. 12/839,130.
Office action dated Jan. 10, 2014 for U.S. Appl. No. 12/839,130.
Office action dated Mar. 14, 2014 for U.S. Appl. No. 13/237,215.
Office action dated Mar. 16, 2012 for U.S. Appl. No. 12/839,130.
Office action dated May 13, 2011 for U.S. Appl. No. 11/839,413.
Office action dated Aug. 21, 2014 for U.S. Appl. No. 12/839,130.
Office action dated Sep. 3, 2014 for U.S. Appl. No. 13/801,333.
Office action dated Oct. 4, 2011 for U.S. Appl. No. 11/839,413.
Office action dated Dec. 11, 2012 for U.S. Appl. No. 13/588,741.
Ouchi, et al. Calcium—Antimony Alloys as Electrodes for Liquid Metal Batteries. Journal of the Electrochemical Society. 2014; 161(12):A1898-A1904.
Pongsaksawad, et al. Phase-Field Modeling of Transport-Limited Electrolysis in Solid and Liquid States. Journal of the Electrochemical Society, 154 (6) pp. F122-F133, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3.

(56) References Cited

OTHER PUBLICATIONS

Shimotake, et al. Bimetallic Galvanic Cells With Fused-Salt Electrolytes. Argonne National Laboratory, Argonne, Illinois, pp. 951-962.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
Villar, et al. Assessment of high-temperature self-assembling battery implementation based on the aluminum smelting process. Massachusetts Institute of Technology. Dept. of Materials Science and Engineering. Issue Date: 2010 http://hdl.handle.net/1721.1/62677.
Weaver, et al. The Sodium1Tin Liquid-Metal Cell. J. Electrochem. Soc., 109 (8), 653-657 (Aug. 1962).
Yu, et al. Determination of the Lithium Ion Diffusion Coefficient in Graphite. J. Electrochem. Soc. 1999 vol. 146, issue 1, 8-14.
Office action dated Dec. 5, 2014 for U.S. Appl. No. 12/839,130.
Liquid-metal batteries get boost from molten lead. Nature news website. Accessed Dec. 9, 2014. http://www.nature.com/news/liquid-metal-batteries-get-boost-from-molten-lead-1.15967.
Molten metal batteries aimed at the grid. BBC News website. Accessed Dec. 9, 2014. http://www.bbc.com/news/science-environment-29284934.
Notice of allowance dated Jan. 6, 2014 for U.S. Appl. No. 13/237,215.
Allanore, A. Features and Challenges of Molten Oxide Electrolytes for Metal Extraction. Journal of the Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kipouros, et al. Toward new technologies for the production of Lithium. JOM, May 1998, pp. 24-26.
Notice of allowance dated Jul. 31, 2015 for U.S. Appl. No. 13/801,333.
Notice of allowance dated Sep. 18, 2015 for U.S. Appl. No. 13/801,333.
Notice of allowance dated Dec. 11, 2015 for U.S. Appl. No. 13/801,333.
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS. Grid Battery Controller Battery Management Solution for Multi-Stack Grid-Scale Energy Storage Systems. 2015.
Office action—Requirement for Restriction Election dated Aug. 13, 2015 for U.S. Appl. No. 14/045,967.
Office action dated Feb. 5, 2016 for U.S. Appl. No. 14/536,549.
Office action dated Nov. 5, 2015 for U.S. Appl. No. 14/178,806.
Office action dated Nov. 24, 2015 for U.S. Appl. No. 14/045,967.
Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Sodium Sulfur-Battery Definition; Wikipedia website. Accessed Sep. 3, 2015. https://en.wikipedia.org/wiki/Sodium%E2%80%93sulfur_battery.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Cerablak™ technology. Atfi Surface Science Solutions. http://www.atfinet.com/index.php/technology. Accessed Feb. 24, 2016.
Co-pending U.S. Appl. No. 15/063,842, filed Mar. 8, 2016.
Co-pending U.S. Appl. No. 15/130,129, filed Apr. 15, 2016.
Co-pending U.S. Appl. No. 15/130,292, filed Apr. 15, 2016.
Co-pending U.S. Appl. No. 15/140,434, filed Apr. 27, 2016.
International preliminary report on patentability dated Mar. 31, 2016 for PCT Application No. PCT/US2014/056367.
Notice of allowance dated Mar. 8, 2016 for U.S. Appl. No. 13/801,333.
European search report and search opinion dated May 6, 2016 for EP Application No. 13847926.
European search report and search opinion dated May 13, 2016 for EP Application No. 13846301.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/0063222.
Office action dated Jun. 7, 2016 for U.S. Appl. No. 14/045,967.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016. With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Notice of allowance dated Jul. 5, 2016 for U.S. Appl. No. 14/178,806.
Office action dated Jun. 30, 2016 for U.S. Appl. No. 14/536,563.
Notice of allowance dated Aug. 22, 2016 for U.S. Appl. No. 14/536,549.

* cited by examiner

| Component | Material | Composition | Amount |
|---|---|---|---|
| Anode | Lithium | 98+% (Battery Grade) | 0.5g |
| Electrolyte | LiF-LiCl-LiBr | 25/20/55 mol% | 240g |
| Cathode | Zn-Sn | 50/50 mol% | 234g |

Operating Parameters:

| Parameter | Value |
|---|---|
| Temperature | 500C |
| Current Density | 200mA/cm² |
| Charge Cutoff Voltage | 2.5V |
| Charge Cutoff Capacity | 2Ah |
| Discharge Cutoff Voltage | 0.1V |

*FIG. 8*

VOLTAGE-ENHANCED ENERGY STORAGE DEVICES

CROSS-REFERENCE

This application claims the benefit of U.S. Provisional Application No. 61/826,965, filed May 23, 2013, U.S. Provisional Application No. 61/885,617, filed Oct. 2, 2013, and U.S. Provisional Application No. 61/925,817, filed Jan. 10, 2014, each of which is entirely incorporated herein by reference.

BACKGROUND

A battery is a device capable of converting chemical energy into electrical energy. Batteries are used in many household and industrial applications. In some instances, batteries are rechargeable such that electrical energy, which may be converted from non-electrical energy (e.g., mechanical energy), is capable of being stored in the battery as chemical energy.

SUMMARY

The present disclosure provides a liquid metal energy storage device (or battery) that can include a negative electrode, electrolyte and positive electrode, at least some of which may be in the liquid state during operation of the energy storage device.

In an aspect, an energy storage device comprises at least one electrochemical cell comprising (a) a negative current collector; (b) a negative electrode in electrical communication with the negative current collector, wherein the negative electrode comprises an alkali or alkaline earth metal; (c) an electrolyte in electrical communication with the negative electrode, wherein upon discharge the electrolyte provides charged species of the alkali or alkaline earth metal; (d) a positive electrode in electrical communication with the electrolyte, wherein the positive electrode comprises one or more Group 12 elements; and (e) a positive current collector in electrical communication with the positive electrode. The negative electrode, electrolyte and positive electrode can be in a liquid state at an operating temperature of at least about 100° C. The energy storage device can have an open circuit voltage greater than about 1 Volt (V).

In an embodiment, the alkali or alkaline earth metal is lithium, sodium, potassium, magnesium or any combination thereof. In another embodiment, the one or more Group 12 elements are selected from the group consisting of zinc and cadmium. In another embodiment, the energy storage device has an open circuit voltage greater than about 1.5 V. In another embodiment, the energy storage device has an open circuit voltage greater than about 2 V. In another embodiment, the positive electrode further comprises one or more of tin, lead, bismuth, antimony, tellurium and selenium. In another embodiment, the electrolyte comprises NaF, NaCl, NaBr, NaI, LiF, LiCl, LiBr, LiI, KF, KCl, KBr, KI, $CaF_2$, $CaCl_2$, $CaBr_2$, $CaI_2$, or any combination thereof.

In another aspect, an energy storage device comprises at least one electrochemical cell, the at least one electrochemical cell comprising (a) a negative electrode that, in a charged state of the at least one electrochemical cell, comprises an alkali or alkaline earth metal; (b) an electrolyte in electrical communication with the negative electrode, wherein upon charge of the at least one electrochemical cell, the electrolyte provides charged species of the alkali or alkaline earth metal; and (c) a positive electrode in electrical communication with the electrolyte, wherein the positive electrode comprises a metal or metalloid. In some embodiments, (i) in a discharged state of the at least one electrochemical cell, the negative electrode and the positive electrode do not contain the alkali or alkaline earth metal, and/or (ii) in a partially or fully charged state of the at least one electrochemical cell, the electrolyte comprises cations of the metal or metalloid dissolved therein. The negative electrode, electrolyte and positive electrode can be in a liquid state at an operating temperature of at least about 100° C. The at least one electrochemical cell can exhibit an open circuit voltage greater than about 1 Volt (V) after at least about 100 charge/discharge cycles.

In an embodiment, (i) in a discharged state of the at least one electrochemical cell, the negative electrode and the positive electrode do not contain the alkali or alkaline earth metal, and (ii) in a partially or fully charged state of the at least one electrochemical cell, the electrolyte comprises cations of the metal or metalloid dissolved therein. In another embodiment, the at least one electrochemical cell exhibits an open circuit voltage greater than about 1.5 V after at least about 100 charge/discharge cycles. In another embodiment, the at least one electrochemical cell exhibits an open circuit voltage greater than about 2 V after at least about 100 charge/discharge cycles. In another embodiment, the alkali metal is lithium, sodium, potassium, or any combination thereof. In another embodiment, the positive electrode comprises at least one metal or metalloid. In another embodiment, the positive electrode comprises a metal that is a transition metal. In another embodiment, the positive electrode comprises a Group 12 element. In another embodiment, the positive electrode further comprises tin. In another embodiment, the positive electrode comprises one or more of tin, lead, bismuth, antimony, tellurium and selenium. In another embodiment, the energy storage device has an energy storage capacity of at least about 30 kWh. In another embodiment, the energy storage device has an energy storage capacity less than about 30 kWh. In another embodiment, the operating temperature is at least about 400° C. In another embodiment, the operating temperature is at least about 450° C. In another embodiment, in a discharged state, the alkali metal is in the alkali or alkaline earth metal of the negative electrode is in the electrolyte. In another embodiment, the electrolyte further comprises NaF, NaCl, NaBr, NaI, LiF, LiCl, LiBr, LiI, KF, KCl, KBr, KI, $CaF_2$, $CaCl_2$, $CaBr_2$, $CaI_2$, or any combination thereof.

In another aspect, a method for charging an energy storage device comprises providing an energy storage device comprising at least one electrochemical cell, comprising: (i) a negative electrode comprising an alkali or alkaline earth metal; (ii) a liquid electrolyte adjacent to the negative electrode, wherein the liquid electrolyte comprises a salt of the alkali or alkaline earth metal; (iii) a positive electrode adjacent to the liquid electrolyte, wherein the positive electrode comprises a metal or metalloid other than an alkali metal. Next, the at least one electrochemical cell is charged through an external load that is electrically coupled to the energy storage device to attain a voltage from about 1 Volt (V) to 2.5 V at an operating temperature of at least about 100° C., wherein upon charging, cations of the metal or metalloid are dissolved into the electrolyte.

In an embodiment, upon charging the at least one electrochemical cell, the metal or metalloid is reversibly directed into the electrolyte. In another embodiment, upon charging the at least one electrochemical cell, the alkali metal is directed from the electrolyte into the negative electrode. In another embodiment, the operating temperature is at least about 200° C. In another embodiment, the operating temperature is at least about 300° C. In another embodiment, the operating temperature is at least about 400° C. In another embodiment, the operating temperature is at least about 450° C. In another embodiment, in a discharged state, the negative electrode has a stoichiometric deficiency of the alkali or alkaline earth metal with respect to the metal or metalloid of the positive electrode. In another embodiment, the voltage is from about 1.5 V to 2.5 V. In another embodiment, the alkali metal is lithium, sodium, potassium, or any combination thereof. In another embodiment, the positive electrode comprises one or more of tin, lead, bismuth, antimony, tellurium and selenium. In another embodiment, the positive electrode comprises at least one transition metal. In another embodiment, the positive electrode further comprises tin. In another embodiment, the positive electrode comprises at least one Group 12 element.

In another aspect, an energy storage device comprises (a) a first electrode comprising a first material; (b) a second electrode comprising a second material; and (c) a liquid electrolyte between the first and second electrodes, wherein the liquid electrolyte is capable of conducting ions from the first material. The energy storage device can be configured such that, upon discharge of the energy storage device, the first and second materials react to form an intermetallic layer at an interface between the second electrode and the electrolyte. The second electrode can have a loading of at least 1.1 ampere-hours per square centimeter ($Ah/cm^2$).

In an embodiment, the second electrode has a loading of at least 1.2 $Ah/cm^2$. In another embodiment, the second electrode has a loading of at least 1.3 $Ah/cm^2$. In another embodiment, the second electrode comprises antimony (Sb) and lead (Pb), and wherein the loading of the second electrode is based on the Sb content of the second electrode. In another embodiment, the second electrode comprises Sb and Pb at a ratio (mol %) of about 20:80, 40:60 or 80:20 Sb to Pb. In another embodiment, the second electrode comprises between about 20 mol % and 80 mol % Sb. In another embodiment, the second electrode comprises between about 20 mol % and 80 mol % Pb. In another embodiment, the energy storage device does not short when operated at 800 milliamperes per square centimeter ($mA/cm^2$).

In another aspect, an energy storage device comprises (a) a first electrode comprising a first material, a second electrode comprising a second material, and a liquid electrolyte between the first and second electrodes, wherein in a charged state, the first electrode is an anode and the second electrode is a cathode, and wherein the liquid electrolyte is capable of conducting ions of the first material; (b) an intermetallic layer disposed at an interface between the second electrode and the electrolyte, wherein the intermetallic layer is formed of the first and second materials; and (c) a crucible or coating surrounding the first electrode, the second electrode, the electrolyte and the intermetallic layer, wherein the crucible or coating is non-wetting with respect to the second material.

In an embodiment, the crucible comprises graphite, silicon carbide (SiC), titanium carbide (TiC), or any combination thereof. In another embodiment, the intermetallic layer contacts the crucible or coating. In another embodiment, the crucible or coating prevents the intermetallic layer from bowing across the electrolyte and contacting the anode. In another embodiment, the crucible or coating lines an interior of a housing of the energy storage device. In another embodiment, the energy storage device is configured such that, during operation, second electrode does not flow between the crucible and the housing. In another embodiment, the coating is bonded to an inner surface of the housing. In another embodiment, the crucible is not a sheath. In another embodiment, the crucible has a thickness from about 3 millimeters (mm) to about 30 mm. In another embodiment, the coating has a thickness that is less than about 1 millimeters. In another embodiment, the crucible or coating is electrically conductive. In another embodiment, the second material comprises at least one Group 12 element.

In another aspect, a method for operating an electrochemical cell comprises (a) providing an electrochemical cell comprising a negative electrode, an electrolyte and a positive electrode, wherein at least one of the negative electrode, the electrolyte and the positive electrode is in a liquid state at an operating temperature of the electrochemical cell; (b) discharging the electrochemical cell to a voltage that is less than about 1 V; and (c) applying a negative voltage to the electrochemical cell subsequent to the discharging.

In an embodiment, the positive electrode comprises a metal. In another embodiment, at least a portion of the metal is deposited on the negative electrode. In another embodiment, upon applying the negative voltage, the metal is removed from the negative electrode. In another embodiment, upon applying the negative voltage, the metal is dissolved into the electrolyte. In another embodiment, upon applying the negative voltage, the metal is re-deposited on the positive electrode. In another embodiment, the metal is zinc, tin, bismuth, or a combination thereof. In another embodiment, the negative voltage is about −0.75 V. In another embodiment, the method further comprises charging the electrochemical cell subsequent to (c). In another embodiment, the negative electrode, the electrolyte and the positive electrode are enclosed in a housing.

In an embodiment, the electrochemical cell further comprises a graphite crucible between the housing and the negative electrode, the electrolyte and the positive electrode. In another embodiment, the housing does not dissolve upon applying the negative voltage to the electrochemical cell.

In an embodiment, the operating temperature is at least about 100° C. In another embodiment, the operating temperature is at least about 500° C. In another embodiment, the operating temperature is between about 500° C. and about 550° C.

In another aspect, a method for operating an energy storage device comprises providing an energy storage device comprising at least one electrochemical cell, the at least one electrochemical cell comprising: (i) a negative electrode comprising a negative electrode material; (ii) a liquid electrolyte adjacent to the negative electrode, the liquid electrolyte comprising an electrolyte material; and (iii) a positive electrode adjacent to the liquid electrolyte, the positive electrode comprising a positive electrode material. Next, the at least one electrochemical cell is subjected to charging and subsequent discharging. Subsequent to discharging, the at least one electrochemical cell is conditioned such that the at least one electrochemical cell reaches a negative voltage.

In an embodiment, the negative electrode material comprises an alkali or alkaline earth metal. In another embodiment, the alkali or alkaline earth metal is lithium, sodium, potassium, magnesium, or any combination thereof. In another embodiment, the electrolyte material comprises a salt of the alkali or alkaline earth metal. In another embodiment, the positive electrode material comprises a metal or metalloid other than the alkali or alkaline earth metal. In another embodiment, the positive electrode material comprises at least one Group 12 element. In another embodiment, the Group 12 element is selected from the group consisting of zinc, cadmium and mercury.

In an embodiment, upon charging, at least a portion of the positive electrode material is dissolved into the electrolyte. In another embodiment, the electrolyte comprises cations of the positive electrode material dissolved therein.

In an embodiment, upon conditioning, at least a portion of the positive electrode, material is deposited on the positive electrode. In another embodiment, the negative electrode and/or the positive electrode is in a liquid state at an operating temperature of the at least one electrochemical cell. In another embodiment, the negative electrode and the positive electrode are in a liquid state at the operating temperature of the at least one electrochemical cell.

In an embodiment, the method further comprises operating the energy storage device at an operating temperature of at least about 100° C.

In an embodiment, the at least one electrochemical cell is charged to a voltage from about 1.5 V to about 2.5 V. In another embodiment, the at least one electrochemical cell is discharged to a voltage of about 0 V.

In an embodiment, the method further comprises conditioning the at least one electrochemical cell at a voltage of less than about 0 V. In another embodiment, the method further comprises conditioning the at least one electrochemical cell at a voltage of about −0.75 V. In another embodiment, the method further comprises charging the at least one electrochemical cell to a first voltage, discharging the at least one electrochemical cell from the first voltage to a second voltage, and conditioning the at least one electrochemical cell at a third voltage, wherein the third voltage is less than the second voltage. In another embodiment, a polarity of the first voltage and the second voltage is opposite from a polarity of the third voltage.

In another embodiment, upon charging, a voltage of the at least one electrochemical cell is less than about 3.3 V. In another embodiment, upon charging, the voltage of the at least one electrochemical cell is less than about 2.5 V. In another embodiment, upon conditioning, a voltage of the at least one electrochemical cell voltage is greater than about −0.75 V. In another embodiment, the method further comprises charging, discharging or conditioning the at least one electrochemical cell through an external load that is electrically coupled to the energy storage device.

Aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

FIG. 8 shows an example of operating conditions for a Li∥Zn—Sn cell;

DETAILED DESCRIPTION

Figure 1:
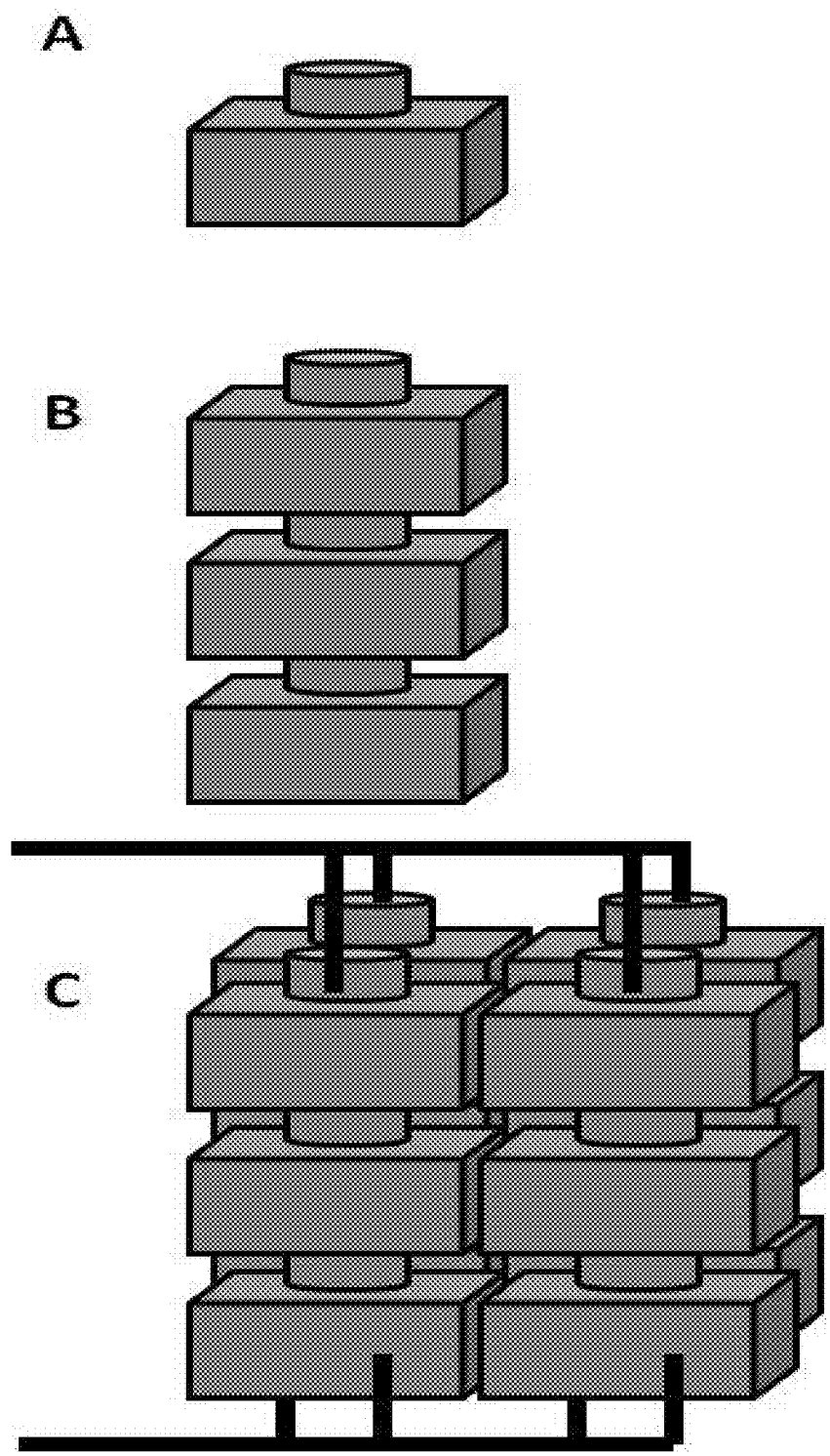
FIG. 1 is an illustration of an electrochemical cell (A) and a compilation (i.e., battery) of electrochemical cells (B and C)

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

This disclosure provides electrochemical energy storage devices (or batteries) and electrochemical battery housings. An electrochemical battery generally includes an electrochemical battery cell sealed (e.g., hermetically sealed) within an electrochemical battery housing.

The term "cell," as used herein, generally refers to an electrochemical cell. A cell can include a negative electrode of material 'A' and a positive electrode of material 'B', denoted as A∥B. The positive and negative electrodes can be separated by an electrolyte. A cell can also include a housing, one or more current collectors, and a high temperature electrically isolating seal.

The term "module," as used herein, generally refers to cells that are attached together in parallel by, for example, mechanically connecting the cell housing of one cell with the cell housing of an adjacent cell (e.g., cells that are connected together in an approximately horizontal packing plane). A module can include a plurality of cells in parallel.

A module can comprise any number of cells (e.g., 2, 3, 4, 5, 6, 7, 8, 9, 10, 11, 12, 13, 14, 15, 16, 17, 18, 19, 20, or more). In some cases, a module comprises 4, 9, 12, or 16 cells. In some cases, a module is capable of storing about 700 Watt-hours of energy and/or delivering about 175 Watts of power. In some cases, a module is capable of storing about 1000 Watt-hours of energy and/or delivering about 500 Watts of power.

The term "pack," as used herein, generally refers to modules that are attached through different electrical connections (e.g., vertically and in series or parallel). A pack can comprise any number of modules (e.g., 1, 2, 3, 4, 5, 6, 7, 8, 9, 10, 11, 12, 13, 14, 15, 16, 17, 18, 19, 20, or more). In some cases, a pack comprises 3 modules. In some cases, a pack is capable of storing about 2 kilowatt-hours of energy and/or delivering about 0.5 kilowatts of power. In some cases, a pack comprises 6 modules. In some cases, a pack is capable of storing about 6.5 kilowatt-hours of energy and/or delivering about 3 kilowatts of power.

The term "core," as used herein generally refers to a plurality of modules or packs that are attached through different electrical connections (e.g., in series and/or parallel). A core can comprise any number of modules or packs (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more). In some cases, the core also comprises mechanical, electrical, and thermal systems that allow the core to efficiently store and return electrical energy in a controlled manner. In some cases, a core comprises 12 packs. In some cases, a core is capable of storing about 35 kilowatt-hours of energy and/or delivering about 7 kilowatts of power. In some cases, a core comprises 32 packs. In some cases, a core is capable of storing at least about 32 kilowatt-hours of energy. In some cases, a core is capable of storing about 200 kilowatt-hours of energy and/or delivering about 100 kilowatts of power.

The term "ace," as used herein, generally refers to a plurality of cores that are attached through different electrical connections (e.g., in series and/or parallel). An ace can comprise any number of cores (e.g., 1, 2, 3, 4, 5, 6, 7, 8, 9, 10, 11, 12, 13, 14, 15, 16, 17, 18, 19, 20, or more). In some cases, the ace contains cores that are connected in parallel with appropriate by-pass electronic circuitry, thus enabling a core to be disconnected while continuing to allow the other cores to store and return energy. In some cases, an ace comprises 4 cores. In some cases, an ace is capable of storing about 100 kilowatt-hours of energy and/or delivering about 25 kilowatts of power. In some cases, an ace comprises 2 cores. In some cases, an ace is capable of storing about 400 kilowatt-hours of energy and/or delivering about 200 kilowatts of power.

The term "system," as used herein, generally refers to a plurality of cores or aces that are attached through different electrical connections (e.g., in series and/or parallel). A system can comprise any number of cores or aces (e.g., 2, 3, 4, 5, 6, 7, 8, 9, 10, 11, 12, 13, 14, 15, 16, 17, 18, 19, 20, or more). In some cases, a system comprises 20 aces. In some cases, a system is capable of storing about 2 megawatt-hours of energy and/or delivering about 500 kilowatts of power. In some cases, a system comprises 5 aces. In some cases, a system is capable of storing about 2 megawatt-hours of energy and/or delivering about 1000 kilowatts of power.

The term "battery," as used herein, generally refers to one or more electrochemical cells connected in series and/or parallel. A battery can comprise any number of electrochemical cells, modules, packs, cores, aces or systems.

The term "cycle," as used herein, generally refers to a charge/discharge or discharge/charge cycle. In some cases, a cycle can comprise conditioning (e.g., charge/discharge/condition or discharge/condition/charge cycle).

The term "vertical," as used herein, generally refers to a direction that is parallel to the gravitational acceleration vector (g).

The term "charge cutoff voltage" or "CCV," as used herein, generally refers to the voltage at which a cell is fully or substantially fully charged, such as in a constant current mode.

The term "open circuit voltage" or "OCV," as used herein, generally refers to the voltage of a cell (e.g., fully or partially charged) disconnected from any circuit or external load (i.e., when no current is flowing through the cell).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

The term "electrode loading," or "loading," as used herein, generally refers to the amount of electrode material (e.g., anode or cathode) placed into an electrochemical cell at assembly. In some cases, electrode loading is quantified in units of ampere-hours per square centimeter ($Ah/cm^2$).

The term "oxidation state," as used herein, generally refers to a possible charged ionic state of a species when dissolved into an ionic solution or electrolyte, such as, for example, a molten halide salt (e.g. $Zn^{2+}$ has an oxidation state of 2+).

The term "single oxidation state," as used herein, generally refers to an element that has only one common oxidation state when dissolved into an ionic solution. (e.g., $Zn^{2+}$ is the only stable charged ionic state of the element zinc, while lead has two stable oxidation states, namely, as $Pb^{2+}$ or $Pb^{3+}$).

Voltages of the present disclosure may be taken or represented with respect to reference voltages, such as ground (0 V).

Electrochemical Energy Storage

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge. In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., tellurium and selenium), or combinations thereof. In some examples, the positive electrode comprises a Group 12 element of the periodic table of the elements, such as one or more of zinc (Zn), cadmium (Cd) and mercury (Hg). In some cases, the positive electrode may form a eutectic mixture (e.g., enabling lower operating temperature of the cell in some cases). The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluroride (NaF), sodium chloride (NaCl), sodium bromide (NaBr), sodium iodide (NaI), lithium fluoride (LiF), lithium chloride (LiCl), lithium bromide LiBr, lithium iodide (LiI), potassium fluoride (KF), potassium chloride (KCl), potassium bromide (KBr), potassium iodide (KI), calcium fluoride ($CaF_2$), calcium chloride ($CaCl_2$), calcium bromide ($CaBr_2$), calcium iodide ($CaI_2$), or any combination thereof. As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof. In some cases, the electrolyte can comprise a mixture of salts. The electrolyte may exhibit low (e.g., minimal) electronic conductance (e.g., electronic shorting may occur through the electrolyte via valence reactions of $PbCl_2 \leftrightarrows PbCl_3$ which increases electronic conductance). For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., or at least about 700° C. In some situations, the battery cell is heated to between about 200° C. and about 600° C., or between about 450° C. and about 575° C. In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged (or energy release) modes. In some cases, the cycling may also include a conditioning mode. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species or can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode).

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Na, Li, Ca, Mg). During charging, the alloy at the positive electrode can disassociate to yield cations of the negative electrode material (e.g. $Na^+$, $Li^+$, $Ca^{2+}$, $Mg^{2+}$), which migrates into the electrolyte. The electrolyte can then provide cations (e.g., the cation of the negative electrode material) to the negative electrode, which replenishes the negative electrode to provide a cell in a charged state. A Type 1 cell can operate in a push-pop fashion, in which the entry of a cation into the electrolyte results in the discharge of the same cation from the electrolyte.

In an example Type 2 cell, in a discharged state the electrolyte comprises cations of the negative electrode material (e.g., $Na^+$, $Li^+$, $Ca^{2+}$, $Mg^{2+}$), and the positive electrode comprises positive electrode material (e.g., Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten. Concurrently, positive electrode material from the positive electrode sheds electrons (e.g., to a positive current collector) and dissolves into the electrolyte as cations of the positive electrode material (e.g., $Pb^{2+}$, $Sn^{2+}$, $Zn^{2+}$). The concentration of the cations of the positive electrode material can vary in vertical proximity within the electrolyte (e.g. as a function of distance above the positive electrode material) based on the atomic weight and diffusion dynamics of the cation material in the electrolyte. In some examples, the cations of the positive electrode material are concentrated in the electrolyte near the positive electrode.

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell can contact and be electrically coupled with an endwall of the container. An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A battery, as used herein, can comprise a plurality of electrochemical cells. Individual cells of the plurality can be electrically coupled to one another in series and/or in parallel. In serial connectivity, the positive terminal of a first cell is connected to a negative terminal of a second cell. In parallel connectivity, the positive terminal of a first cell can be connected to a positive terminal of a second, and/or additional, cell(s).

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (e.g., a compilation of electrochemical cells). The cells can be arranged in parallel, in series, or both in parallel and in series (C).

Electrochemical cells of the disclosure may be capable of storing and/or receiving input of ("taking in") substantially large amounts of energy. In some instances, a cell is capable of storing and/or taking in (i.e., having an energy storage capacity of) about 1 Watt-hour (Wh), about 5 Wh, 25 Wh, about 50 Wh, about 100 Wh, about 250 Wh, about 500 Wh, about 1 kilowatt-hour (kWh), about 1.5 kWh, or about 2 kWh. In some instances, the battery is capable of storing and/or taking in at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. It is recognized that the amount of energy stored in an electrochemical cell and/or battery may be less than the amount of energy taken into the electrochemical cell and/or battery (e.g., due to inefficiencies and losses). A cell can be capable of providing a current at a current density of at least about 10 milliamperes per square centimeter ($mA/cm^2$), 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95% and the like. In some instances, a cell can be capable of operating at a charge efficiency of at least about 10%, 20%, 30%, 40%, 50%, 60%, 70%, 80%, 85%, 90%, 95%, 98%, 99%, and the like.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (e.g., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a substantially large amount of energy for use with a power grid (i.e., a grid-scale battery) or other loads or uses. In some instances, a battery is capable of storing and/or taking in about 5 kilowatt-hour (kWh), about 25 kWh, about 50 kWh, about 100 kWh, about 500 kWh, about 1 megawatt-hour (MWh), about 1.5 MWh, about 2 MWh, about 3 MWh, about 5 MWh, about 10 MWh, about 25 MWh, about 50 MWh or about 100 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxides comprising of lithium oxide, calcium oxide, barium oxide, yttrium oxide, silicon oxide, aluminum oxide, or lithium nitride, or any combinations thereof). The seal may be made hermetic by one or more methods. For example, the seal may be subject to relatively high compressive forces (e.g., greater than 10,000 psi) between the container lid and the container in order to provide a seal in addition to electrical isolation. Alternatively, the seal may be bonded through a weld, a braze, or other chemically adhesive material that joins relevant cell components to the insulating sealant material.

Figure 2:
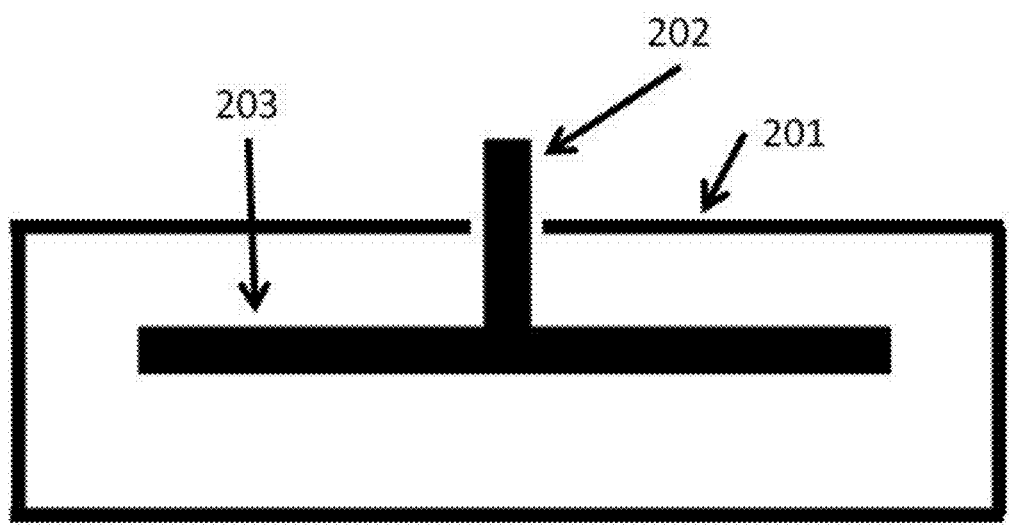
FIG. 2 is a schematic cross-sectional illustration of a housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, about 0.2, or about 0.3. In some cases, the ratio of the area of the aperture to the area of the housing is less than or equal to 0.001, less than or equal to 0.005, less than or equal to 0.01, less than or equal to 0.05, less than or equal to 0.1, less than or equal to 0.15, less than or equal to 0.2, or less than or equal to 0.3.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.3, 0.2, 0.15, 0.1, 0.05, 0.01, 0.005, or 0.001.

A cell housing can comprise an electrically conductive container and a conductor in electrical communication with a current collector. The conductor protrudes through the container through an aperture in the container and is electrically isolated from the container. The ratio of the area of the aperture to the area of the container may be less than about 0.3, 0.2, 0.15, 0.1, 0.05, 0.01, 0.005, or 0.001. The housing can be capable of enclosing a cell that is capable of storing and/or taking in less than 100 Wh of energy, about 100 Wh of energy, or more than 100 Wh of energy. The cell can be capable of storing and/or taking in at least about 1

Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
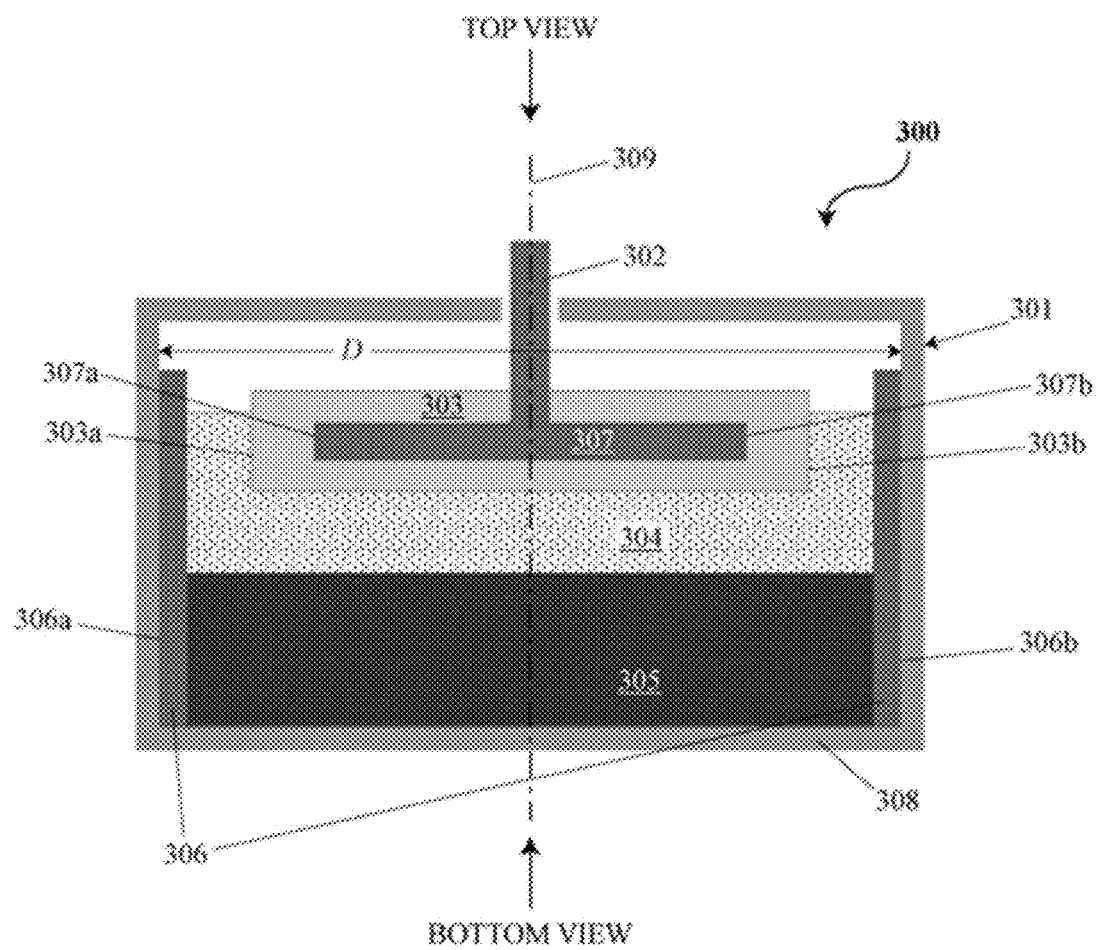
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The negative current collector 307 may comprise foam material that behaves like a sponge, and is "soaked" in negative electrode liquid metal 303. The liquid metal negative electrode 303 is in contact with the molten salt electrolyte 304. The liquid metal (e.g., salt) electrolyte is also in contact with the positive liquid metal electrode 305. The positive liquid metal electrode 305 can be in electrical communication with the housing 301 along the side walls and/or along the bottom end wall of the housing.

The housing may include a container and a container lid (e.g., cell cap). The container and container lid may be connected mechanically. The negative current lead may be electrically isolated from the container and/or container lid (e.g., cell cap), via, for example, the use of an electrically insulating hermetic seal. In some embodiments, an electrically insulating barrier (e.g., seal) may be provided between the negative current lead and the container lid. As an alternative, the seal can be in the form of a gasket, for example, and placed between the container lid, and the container. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the liquid positive electrode 305.

The housing 301 can be constructed from an electrically conductive material such as, for example, steel, iron, stainless steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 can comprise a housing interior 306. The housing interior 306 may include, but is not limited to, a sheath (e.g., a graphite sheath), a coating, a crucible (e.g., a graphite crucible), a surface treatment, a lining, or any combination thereof). In one example, the housing interior 306 is a sheath. In another example, the housing interior 306 is a crucible. In yet another example, examples, the housing interior 306 is a coating or surface treatment. The housing interior 306 may be thermally conductive, thermally insulating, electrically conductive, electrically insulating, or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte.

The housing may comprise a thinner lining component of a separate metal or compound, or a coating (e.g., an electrically insulating coating), such as, for example, a steel housing with a graphite lining, or a steel housing with a nitride coating or lining (e.g., boron nitride, aluminum nitride), a titanium coating or lining, or a carbide coating or lining (e.g., silicon carbide, titanium carbide). The coating can exhibit favorable properties and functions, including surfaces that are anti-wetting to the positive electrode liquid metal. In some cases, the lining (e.g., graphite lining) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

The housing 301 may include a thermally and/or electrically insulating sheath or crucible 306. In this configuration, the negative electrode 303 may extend laterally between the side walls of the housing 301 defined by the sheath or crucible without being electrically connected (i.e., shorted) to the positive electrode 305. Alternatively, the negative electrode 303 may extend laterally between a first negative electrode end 303a and a second negative electrode end 303b. When the sheath or crucible 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The housing interior (e.g., sheath, crucible and/or coating) 306 can be constructed from a thermally insulating, thermally conductive, and/or electrically insulating or electrically conductive material such as, for example, graphite, carbide (e.g., SiC, TiC), nitride (e.g., BN), alumina, titania, silica, magnesia, boron nitride, or a mixed oxide, such as, for example, calcium oxide, aluminum oxide, silicon oxide, lithium oxide, magnesium oxide, etc. For example, as shown in FIG. 3, the sheath (or other) housing interior 306 has an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the housing interior 306 can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, titanium, or titanium nitride. For example, the sheath may be very thin and may be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (e.g., Pb, Sn, Bi) can be used to provide a strong electrical connection between the sheath/coating and the cell housing. This layer can allow for easier fabrication and assembly of the cell.

In some cases, the crucible or coating can be non-wetting to (e.g., partially or substantially not wet by) the liquid positive electrode material (e.g., liquid positive electrode metal). In some cases, the crucible or coating can have a given wetting angle when in contact with the liquid positive electrode material and/or the electrolyte salt. In some examples, a wetting angle of at least about 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, 90 degrees, and the like may exist in the presence of a liquid positive electrode material and/or a molten salt on the crucible surface. In an example, a wetting angle on the crucible or coating in the presence of a liquid positive electrode material and/or a molten salt on the crucible surface can be about 15 degrees, 45 degrees, or 90 degrees, or 100 degrees, or 130 degrees.

In some examples, the crucible can have a thickness from about 3 millimeter (mm) to about 30 mm. In some examples, the crucible (e.g., graphite crucible) can have a thickness of at least or equal to about 3 mm, 6 mm, 9 mm, 12 mm, 15 mm, 20 mm, 30 mm and the like. In some examples, the crucible (e.g., graphite crucible) can have a thickness of less than about 3 mm, 6 mm, 9 mm, 12 mm, 15 mm, 20 mm, 30 mm and the like. In some examples, the coating can be less than about 1 mm thick. In some examples, the coating can be at least about 1 micrometer thick. For example, the coating can be from about 1 micrometer to about 1 mm thick. The crucible or coating can be formed from any housing interior materials described. In an example, the crucible or coating comprises graphite, TiC, SiC, or any combination thereof.

In some cases, a method for preparing a crucible may include drying the crucible by heating the crucible above room temperature in air or in a vacuum oven before or after being placed inside the cell housing. In some examples, the crucible may be dried for at least about 0.1 hour, 0.5 hour, 1 hour, 1.5 hours, 2 hours, 2.5 hours, 3 hours, 3.5 hours, 4 hours, and the like. In some examples, the crucible may be dried at a temperature of at least about 100° C., at least about 100° C., at least about 300° C., and the like. In an example, the crucible is dried at a temperature of at least or equal to about 100° C. for at least 1 hour. For example, the crucible may be dried at a temperature between about 100° C. and 200° C., 150° C. and 200° C., 150° C. and 200° C., and the like for at least about 1 hour, between about 1 and 2 hours, between about 1 and 3 hours, etc. Drying or heating the crucible may remove moisture from the crucible prior to adding the electrolyte, positive electrode, or negative electrode to the cell housing.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or similar to the diameter of the cavity defined by the housing 301. In some cases, the negative current collector 307 may have a collector diameter (or other characteristic dimension, illustrated in FIG. 3 as the distance from 307a to 307b) that is less than, or similar to (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the housing. In some cases, the positive current collector may not be electrically connected to the housing. The present disclosure is not limited to any particular configurations of the negative and/or positive current collector configurations.

The negative electrode 303 can be contained within the negative current collector (e.g., foam) 307. In this configuration, the electrolyte layer comes up in contact with the bottom, sides, and/or the top of the foam 307. The metal contained in the foam (i.e., the negative electrode material) can be held away from the sidewalls of the housing 301, such as, for example, by the absorption and retention of the liquid metal negative electrode into the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, or less than or equal to about 115%, less than or equal to about 125%, less than or equal to about 150%, less than or equal to about 175%, less than or equal to about 200%, less than or equal to about 250%, or less than or equal to about 300% of the average density of current flowing across the surface. In some examples, the minimum density of current flowing across an area of the surface is greater than or equal to about 50%, greater than or equal to about 60%, greater than or equal to about 70%, greater than or equal to about 80%, greater than or equal to about 90%, or greater than or equal to about 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be at least about 5%, 10%, 20%, 30%, 40%, 50%, 60%, 70%, 80%, 90%, or 95% of the volume of the battery (e.g., as defined by the outer-most housing of the battery, such as a shipping container). In some cases, the combined volume of anode and cathode material is at least about 5%, at least about 10%, at least about 20%, at least about 30%, at least about 40%, at least about 50%, at least about 60%, or at least about 75% of the volume of the cell. The combined volume of the positive and negative electrodes material may increase or decrease (e.g., in height) during operation due to growth or expansion, or shrinkage or contraction, respectively, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode, or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
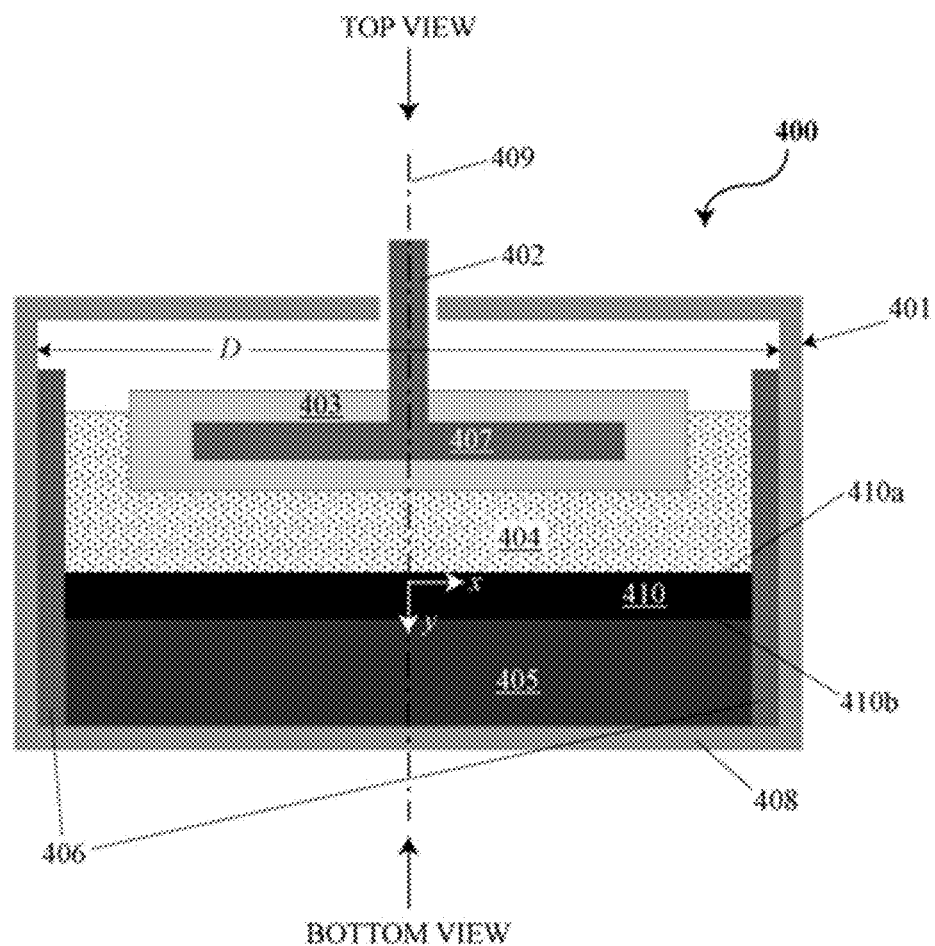
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li or Mg), the positive liquid metal electrode 405 can comprise one or more of transition metal, d-block (e.g., Group 12), Group IIIA, IVA, VA or VIA elements (e.g., lead and/or antimony), and the intermetallic layer 410 can comprise a mutual reaction compound or product thereof (e.g., alkali plumbide or antimonide, e.g., $Na_3Pb$, $Li_3Sb$, or $Mg_3Sb_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g. $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and about 750° C. In a charged state, all or substantially all the components of the cell can be in a liquid state. Alternative chemistries exist, including Ca—Mg∥Bi comprising a calcium halide constituent in the electrolyte (e.g., $CaCl_2$, KCl, LiCl, or combinations thereof) and operating above about 500° C., Li∥Pb—Sb cells comprising a lithium halide electrolyte (e.g., LiF, LiCl, LiBr, or combinations thereof) and operating between about 350° C. and about 550° C., and Na∥Pb cells comprising a sodium halide as part of the electrolyte (e.g., NaCl, NaBr, NaI, NaF, LiCl, LiF, LiBr, LiI, KCl, KBr, KF, KI, $CaCl_2$, $CaF_2$, $CaBr_2$, $CaI_2$ or combinations thereof) and operating above about 300° C. In some cases, the product of the discharge reaction may be an intermetallic compound (e.g., $Mg_3Sb_2$ for the Mg∥Sb cell chemistry, $Li_3Sb$ for the Li∥Pb—Sb chemistry, or $Ca_3Bi_2$ for the Ca—Mg∥Bi chemistry), where the intermetallic layer may develop as a distinct solid phase (e.g., by growing and expanding horizontally along a direction x and/or growing or expanding vertically along a direction y at the interface between the positive electrode and the electrolyte). The growth may be axially symmetrical or asymmetrical with respect to an axis of symmetry 409 located at the center of the cell or battery 400.

Intermetallic Layer Bridging and Electrode Loading

In some situations, during discharge of the energy storage device, an intermetallic layer forms between the positive electrode and the electrolyte. The intermetallic layer can be solid or semi-solid. During discharge of the energy storage device, the intermetallic layer can bulge and/or bow towards the negative electrode. In some situations, contact between the intermetallic layer and the negative electrode can cause a short in the energy storage device. Recognized herein is the need to prevent such a short.

Figure 5:
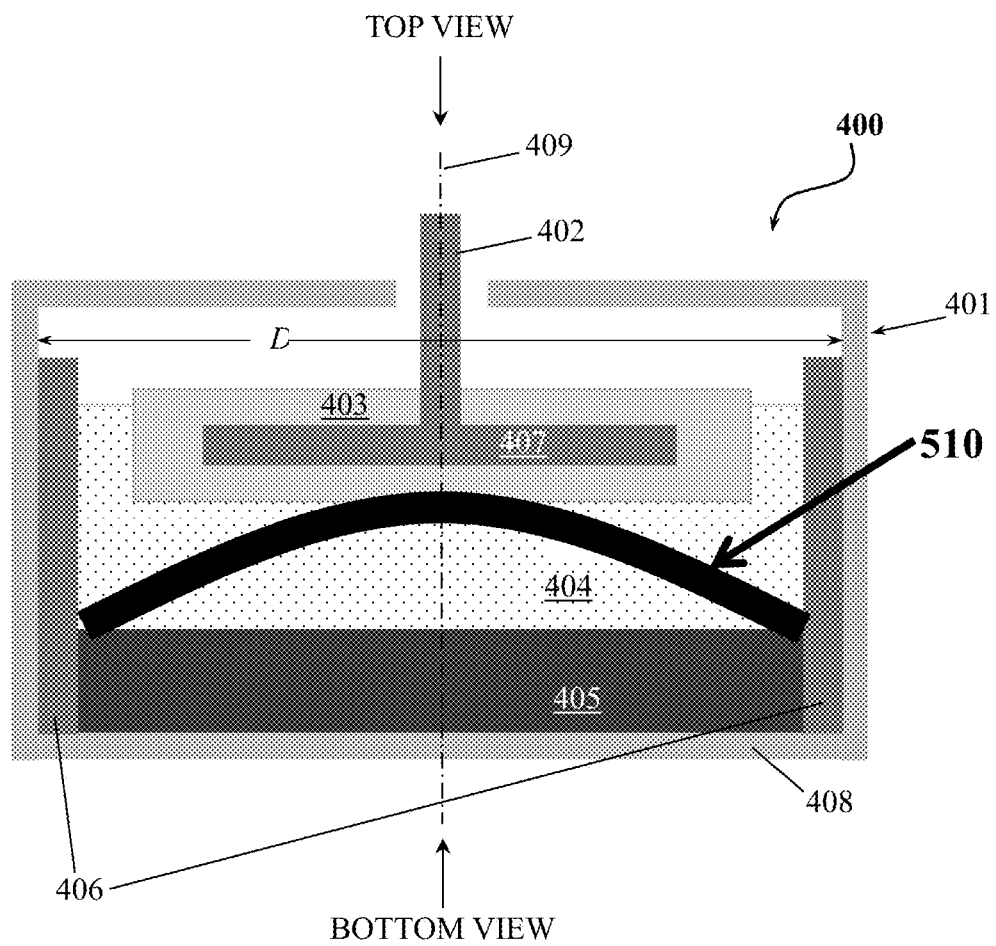
FIG. 5 is a cross-sectional side view of an electrochemical cell or battery with a bowed intermetallic layer.

FIG. 5 shows cross-sectional illustration of an electrochemical cell having a bowed intermetallic layer 510. For example, discharging a Mg∥Sb liquid metal battery may involve the generation of a solid $Mg_xSb$ intermetallic layer between the liquid Sb positive electrode (cathode during discharge) and the molten salt electrolyte. Under some conditions, the intermetallic layer 510 can grow in such a manner that it separates from the liquid Sb positive electrode (cathode during discharge) 405 and bows upwards. In extreme cases, the bowing can extend all the way through the electrolyte and come into physical contact with the negative electrode (anode during discharge) 403, providing an electronic short and rendering the battery unable to store and/or provide electrical energy.

The energy storage capacity of the electrochemical cell can have an effect on bowing of the intermetallic layer. In some cases, the shorting due to intermetallic bowing does not occur when the cell is operated with low capacity (e.g., less than about 0.75 ampere-hours per square centimeter ($Ah/cm^2$) magnesium (Mg) anode loading with about 1 $Ah/cm^2$ cathode antimony (Sb) loading). In some instances, the cell shorts at higher electrode capacities (e.g., both anode and cathode capacities near about 1 $Ah/cm^2$).

The bowing of the intermetallic layer can be prevented by increasing the distance between the anode and cathode (i.e., by increasing the electrolyte layer thickness). The amount of electrolyte and/or distance between the anode and the cathode can be any suitable value such that the intermetallic layer does not cause a short. Preventing shorting by varying the amount of electrolyte can be done at the expense of round-trip cell voltage and/or cell energy efficiency (e.g., due to an increase in cell internal resistance).

Another way to avoid cell shorting due to intermetallic bowing is to limit the amount of active materials in the cell, thus reducing the overall volume change of the intermetallic layer. Reducing the amount of anode material allowed to deposit into the cathode can allow the cell to operate without the formation of the solid intermetallic layer. However, preventing shorting using either of these approaches can significantly reduce the cell's energy storage capacity in some instances.

Altering the relative negative electrode (anode during discharge) to positive electrode (cathode during discharge) ratio in the cell during cell assembly can reduce the magnitude of intermetallic bowing (e.g., even under high anode loading). In some cases, the energy storage device does not short when operated at high discharge current density.

Shorting due to intermetallic bowing may be addressed by modifying the cathode to anode ratio and overall electrode loading to suppress bowing of the solid cathode (and/or intermetallic layer). Described herein is an energy storage device comprising a first electrode comprising a first material, a second electrode comprising a second material and a liquid electrolyte. The electrolyte can be between the first and second electrodes. The liquid electrolyte can be capable of conducting ions from the first material, where upon discharge of the energy storage device, the first and second materials react to form an intermetallic layer at an interface between the second electrode and the electrolyte. In some cases, the intermetallic layer does not bow across the electrolyte and contact the anode.

The positive electrode (cathode during discharge) can have any suitable loading (e.g., such that the device does not short). The cathode loading can be about 0.7, about 0.8, about 0.9, about 1.0, about 1.1, about 1.2, about 1.3, about 1.4, about 1.5, about 1.6, about 1.8, or about 2.0 ampere-hours per square centimeter ($Ah/cm^2$). In some examples, the cathode loading can be at least about 0.7, at least about 0.8, at least about 0.9, at least about 1.0, at least about 1.1, at least about 1.2, at least about 1.3, at least about 1.4, at least about 1.5, at least about 1.6, at least about 1.8, or at least about 2.0 ampere-hours per square centimeter ($Ah/cm^2$). The cathode loading can be based on, for example, the antimony or bismuth content (or other positive electrode species) of the cathode. For example, in the case where the negative electrode (anode during discharge) comprises molten lithium (Li) and the positive electrode (cathode during discharge) comprises molten antimony (Sb) and lead (Pb) in a 40:60 mol % ratio (Sb:Pb), the cathode loading is defined based on 3 electrons per antimony atom and one electron per lithium atom. In some examples, relative loading of a negative electrode material comprising a negative electrode species versus a positive electrode material comprising at least one positive electrode species can include an ampere-hour (Ah) capacity ratio of $Ah/cm^2$ of the negative electrode species to $Ah/cm^2$ of the at least one positive electrode species of about 0.1, 0.2, 0.3, 0.4, 0.5, 0.6, 0.7, 0.8, 0.9, 1, 1.1, 1.2, 1.3, 1.4, 1.5, 1.5, 1.6, 1.7, 1.8, 1.9, 2, or more. The capacity ratio can be, for example, based relative number of electrons per atom of the negative electrode species and the positive electron species. For example, a relative loading of Li to Sb—Pb can include a Li to Sb ampere-hour (Ah) capacity ratio of at least about 1 $Ah/cm^2$ Li to 1.1 $Ah/cm^2$ Sb, where the capacity of Sb is 3 electrons per atom and the capacity of Li is 1 electron per atom and the area is based on the flat geometric surface area of the top of the positive electrode. In another example, a relative loading of Li to Sb—Pb can include a Li to Sb ampere-hour (Ah) capacity ratio of at least about 1 $Ah/cm^2$ Li to 1.3 $Ah/cm^2$ Sb. The loading of the anode can be at least about 0.1 $Ah/cm^2$, at least about 0.2 $Ah/cm^2$, at least about 0.3 $Ah/cm^2$, at least about 0.4 $Ah/cm^2$, at least about 0.5 $Ah/cm^2$, at least about 0.6 $Ah/cm^2$, at least about 0.7 $Ah/cm^2$, at least about 0.8 $Ah/cm^2$, at least about 0.9 $Ah/cm^2$, at least about 1.0 $Ah/cm^2$, at least about 1.1 $Ah/cm^2$, at least about 1.2 $Ah/cm^2$, at least about 1.5 $Ah/cm^2$, at least about 2 $Ah/cm^2$, or at least about 3 $Ah/cm^2$.

In some examples, the positive electrode (cathode during discharge) comprises a first positive electrode species and a second positive electrode species at a ratio (mol %) of about 20:80, 40:60 or 80:20 of the first positive electrode species to the second electrode species. In some examples, the positive electrode comprises Sb and Pb at a ratio (mol %) of about 20:80, 40:60 or 80:20 Sb to Pb. In some examples, the positive electrode comprises between about 20 mol % and 80 mol % of a first positive electrode species mixed with a second positive electrode species. In some cases, the positive electrode comprises between about 20 mol % and 80 mol % Sb (e.g., mixed with Pb). In some cases, the positive electrode comprises between about 20 mol % and 80 mol % Pb (e.g., mixed with Sb).

A sheath or crucible (e.g., a sheath or crucible that is not wet by the liquid metal positive electrode material) can be used in a cell to prevent shorting due to positive electrode creep up the sidewall of the sheath and subsequent break-off of the intermetallic discharge process, leading to electronic shorting. In some examples, without the use of a sheath that is not wet by the metal, the positive liquid metal layer may wet the sidewall of the housing, and during the discharge process, the negative electrode metal can deposit into this thin layer and form a solid intermetallic compound. The solid intermetallic compound can break away from the sidewall, come into contact with the negative electrode and/or negative current collector, and form a bridge between the negative electrode or current collector, thus creating an electronic shorting path, reducing the performance of the cell and/or rendering the cell incapable of electrical energy storage. However, in some cases, the positive electrode material can creep behind the sheath (e.g., graphite sheath), which can lead to volume loss of the positive electrode and effective reduction in the positive electrode capacity, inciting intermetallic bowing and shorting (e.g., based on the low effective loading of the positive electrode due to the loss of some of the electrode). In some implementations, a crucible may be used instead of a sheath (e.g., to prevent the propensity of the cell to experience shorting from intermetallic bowing, such as, for example, based on the reduction of the effective quantity of the positive electrode material). In some examples, the sheath or crucible (e.g., graphite sheath or graphite crucible) may have a thickness of about 3 mm, about 6 mm, about 9 mm, about 12 mm, about 15 mm, or more. In some examples, the sheath or crucible may have a thickness of less than about 3 mm, less than about 6 mm, less than about 9 mm, less than about 12 mm, less than about 15 mm, and the like.

In some examples, the crucible is made of graphite, but this is not required. The crucible can be made of any material that does not melt at the operating temperature of the battery and is electrically conductive. In some cases, the crucible can be made of any material that does not melt at the operating temperature of the battery, is electrically conductive and does not allow the liquid positive metal electrode to wick up the sidewalls to a level sufficient to enable cell shorting due to flaking off of the intermetallic discharge product. The crucible can be made to be in electronic contact with the cell housing by means of a thin layer of a conductive liquid metal or semi-solid metal alloy located between the crucible and the cell housing, such as the elements Pb, Sn, Sb, Bi, Ga, In, Te, or a combination thereof.

The disclosure provides an energy storage device comprising a first electrode comprising a first material, a second electrode comprising a second material, and a liquid electrolyte between the first and second electrodes. The liquid electrolyte can be capable of conducting ions from the first material, where upon discharge of the energy storage device the first and second materials react to form an intermetallic layer at an interface between the second electrode and the electrolyte. The energy storage device can also include a graphite crucible surrounding the first electrode, the second electrode and the electrolyte. In some cases, the intermetallic layer contacts the graphite crucible.

The graphite crucible can prevent the intermetallic layer from bowing across the electrolyte and contacting the anode. In some instances, the graphite crucible is not a graphite sheath.

In some cases, the graphite crucible lines the interior of a housing. The cathode may not flow between the graphite crucible and the housing.

Type 1 and Type 2 Modes of Operation

Liquid metal batteries can provide a distinguished opportunity to achieve a long lifespan system that is relatively simple to assemble. A cell of a liquid metal battery of the present disclosure may be operated in a manner that utilizes symmetric or substantially symmetric electrode reactions in the form of an alloying/de-alloying electrochemical reaction (referred to herein as "low voltage operation" mode, or "Type 1" mode). In some cases, in Type 1 mode, a cell is operated at a voltage from about 0.4 Volt (V) to 1.5 V. Here, one active metal species may be present in the negative electrode and as an alloyed species in the positive electrode, and may be the only metal species that dissolves in or is extracted from the electrolyte during cell discharging and charging, respectively. The composition of the electrolyte therefore may not substantially change during the low voltage operation mode. Such mode of operation may provide a relatively low cell voltage, resulting in a relatively low energy density.

A second mode in which liquid metal battery cells of the present disclosure can operate involves a non-symmetric or substantially non-symmetric reaction where one metal species is electrochemically active at one electrode and a second metal species is electrochemically active at the other electrode, resulting in a net change in the composition of the electrolyte at different states of charge. This mode of operation (referred to herein as "high voltage operation" mode, "Type 2" mode, or cells using "displacement salt electrode" operation or mechanism) can initiate new chemical reactions compared to the Type 1 mode of operation (e.g., in addition to or instead of alloying reaction at the positive electrode), in some cases resulting in, or otherwise utilizing, a relatively higher cell voltage (e.g., 1.5 V to 2.5 V, or 1 V to 4 V). Type 2 mode of operation can offer the possibility of using a wider variety of active materials, and combinations of such materials, as the electrochemistry of the cell.

In some examples, a Type 1 cell includes a negative electrode comprising an alkali or alkaline earth metal (e.g., lithium, magnesium, sodium), and a positive electrode comprising a poor metal, or alloys of such metals (e.g., one or more of tin, lead, bismuth, antimony, tellurium and selenium). The negative electrode and positive electrode can be in a liquid (or molten) state at an operating temperature of the cell. The negative and positive electrodes can be separated by a salt electrolyte (e.g., alkali or alkaline earth metal halide salts).

In a charged state, a Type 1 cell, when operated under Type 2 mode, can have a voltage of at least about 0.5 V, 1 V, 1.5 V, 2 V, 2.5 V, or 3 V in a charged state. In some cases, a Type 1 cell, when operated under Type 2 mode, can have an open circuit voltage (OCV) of at least about 0.5 V, 1 V, 1.5 V, 2 V, 2.5 V, or 3 V. In an example, a Type 1 cell, when operated under Type 2 mode, has an open circuit voltage greater than about 1 V, greater than about 2 V, or greater than about 3 V. In some cases, a charge cutoff voltage (CCV) of a Type 1 cell, when operated in Type 2 mode, is from about 1 V to 3 V, 1.5 V to 2.5 V, 1.5 V to 3 V, or 2 V to 3 V in a charged state. In some cases, a voltage of a Type 1 cell, when operated in Type 2 mode, is from about 1 V to 3 V, 1.5 V to 2.5 V, 1.5 V to 3 V, or 2 V to 3 V in a charged state. A Type 1 cell can provide such voltage(s) upon operating at up to and exceeding about 10 cycles, 20 cycles, 30 cycles, 40 cycles, 50 cycles, 100 cycles, 200 cycles, 300 cycles, 400 cycles, 500 cycles, 1000 cycles, 2000 cycles, 3000 cycles, 4000 cycles, 5000 cycles, 10,000 cycles, or 20,000 cycles. In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container. During operation at an operating temperature of the Type 1 cell, the Type 1 cell can have a negative electrode, electrolyte and positive electrode in a liquid (or molten) state.

A Type 1 cell of the present disclosure, when operated in Type 2 mode, can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 mA/cm$^2$, 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$.

In a charged state, a Type 1 cell, when operated under Type 1 mode, can have a voltage of at least about 0.5 V, 0.6 V, 0.7 V, 0.8 V, 0.9 V, 1 V, 1.2 V, or 1.5 V in a charged state. In some cases, a Type 1 cell, when operated under Type 1 mode, can have an open circuit voltage (OCV) of at least about 0.5 V, 0.6 V, 0.7 V, 0.8 V, 0.9 V, 1 V, 1.2 V, or 1.5 V. In an example, a Type 1 cell, when operated under Type 1 mode, has an open circuit voltage greater than about 0.5 V. In some cases, a charge cutoff voltage (CCV) of a Type 1 cell, when operated in Type 1 mode, is from about 0.5 V to 1.5 V in a charged state. In some cases, a voltage of a Type 1 cell, when operated in Type 1 mode, is from about 0.5 V to 1.5 V in a charged state. A Type 1 cell can provide such voltage(s) upon operating at up to and exceeding about 10 cycles, 20 cycles, 30 cycles, 40 cycles, 50 cycles, 100 cycles, 200 cycles, 300 cycles, 400 cycles, 500 cycles, 1000 cycles, 2000 cycles, 3000 cycles, 4000 cycles, 5000 cycles, 10,000 cycles, or 20,000 cycles. In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container. During operation at an operating temperature of the Type 1 cell, the Type 1 cell can have a negative electrode, electrolyte and positive electrode in a liquid (or molten) state.

A Type 1 cell of the present disclosure, when operated in Type 1 mode, can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 mA/cm$^2$, 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$.

The present disclosure provides cell design criteria that may address failure mechanisms, enabling the cells to achieve a long lifespan and optimum performance. Type 2 cell operation can advantageously provide opportunities for new cell chemistries that are lower cost, less hazardous and/or nontoxic, and that use more earth abundant materials.

The present disclosure provides various non-limiting approaches for operating cells under the Type 2 mode. In a first approach, a cell with positive and negative electrode materials that are ordinarily configured for use in a Type 1 mode is operated in a Type 2 mode of operation. In a second approach, a cell comprises materials that are configured for use in Type 2 mode of operation.

Under the first approach, a cell configured for use in a Type 1 mode is operated in Type 2 mode (e.g., voltage from 1.5 V to 2.5 V or higher), for example by charging the cell to a higher voltage and/or having less negative electrode material in the cell. Any operationally requisite negative electrode material can be supplied by the electrolyte during cell charging. In an example, the Type 1 cell is Li||Pb or Li||Sb—Pb with a lithium containing electrolyte (e.g., LiF, LiCl, LiBr or a combination thereof). The cell is deficient in Li in the negative electrode, but during cell charging Li is supplied from the electrolyte to the negative electrode. In some examples, the Type 1 cell has an operating temperature of at least about 450° C., 500° C., or 550° C., in some cases between about 500° C. and 550° C. In a charged state, all or substantially all of the components of the Type 1 cell are in a liquid state.

Under Type 1 mode, the Type 1 cell can be charged to a voltage from about 0.5 V to 1.5 V to attain a charged or substantially charged state, and subsequently discharged to attain a discharged or substantially discharged state. However, under Type 2 mode, the Type 1 cell can be charged to a voltage from about 1.5 V to 2 V or higher (e.g., 1.5 V to 4 V). The quantity of lithium in the negative electrode in such a case can be in stoichiometric balance with the quantity of Sb and/or Pb in the positive electrode. As an alternative, the Type 1 cell can have a negative electrode with a stoichiometric deficiency of a negative electrode material (e.g., Li). Under Type 2 mode (e.g., at a CCV from about 1.5 V to 2.5 V or higher), during charging, one or more components of the positive electrode (e.g., Pb or Sb) can be removed from the positive electrode and dissolved into the electrolyte as a cation (e.g., Pb$^{+2}$). Concurrently, one or more components of the negative electrode (e.g., Li) can be removed from the electrolyte, in its ionic form (e.g., Li$^+$), and deposited into the negative electrode in metallic form. A cell thus formed can have a higher chemical potential relative to a cell operating under the Type 1 mode.

A Type 1 cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible. In other cases, the cell may not use a graphite sheath, coating, crucible, surface treatment or lining on an inner wall of the cell crucible.

In an example, a Li||Pb cell with a lithium halide (e.g., LiF, LiCl, LiBr or a combination thereof) electrolyte that is configured for use as a Type 1 cell can operate in Type 2 mode through the following example reactions: during charging, Li$^+$ ions from the electrolyte accept an electron from the top/negative current collector (e.g., foam current collector) and deposit as liquid Li metal, wetting into the foam/porous structure. Concurrently, Pb atoms shed electrons and subsequently dissolve into the electrolyte as Pb$^{2+}$. The Pb$^{2+}$ ions and respective halide salt (e.g., PbCl$_2$) can be more dense than the remainder of the lithium halide electrolyte. Hence, Pb ion species may be driven by gravitation to remain concentrated towards the positive electrode. The Pb ions may be concentrated at the bottom of the electrolyte layer. Since Li metal is deposited onto the foam from the electrolyte, the system may not require any Li metal during the time of assembly, but rather, can be assembled in a discharged state having only a Li salt electrolyte and a Pb or Pb alloy (e.g., Pb—Sb) positive electrode. In some examples, upon charge, the Li∥Pb is charged until a voltage of at least about 1.5 V, 2 V, 2.5 V, or 3 V or higher is obtained. The voltage in some cases can be from about 1 V to 2 V, 1 V to 2.5 V, 1 V to 3 V, 1.5 V to 2.5 V, 1.5 V to 3 V, 2 V to 3 V, 1.5 V to 2.0 V, or 1.5 V to 2.5 V in a charged state.

During operation of a cell under Type 1 mode or Type 2 mode, material of the positive electrode may dissolve in the electrolyte and in some cases migrate to the negative electrode, where it may deposit into the negative electrode or alloy with the material of the negative electrode. In some situations, this may degrade the operation of the cell, through, for example, decreasing the operating voltage of the cell. In addition to, or as an alternative, a material of the negative electrode (e.g., Li) may react with a material of the positive electrode (e.g., Pb) in the electrolyte, which may form a particle cloud that may decrease cell performance and in some cases cause a shorting path between the negative and positive electrodes. The present disclosure provides various approaches for minimizing the possibility of (i) material of the positive electrode from depositing into the negative electrode or alloying with the material of the negative electrode, and (ii) material of the negative electrode from reacting with the material of the positive electrode in the electrolyte. These include, without limitation, selecting positive electrode components to have requisite free energies of formation ($\Delta G_f$) with a halide salt, selecting a thickness of the electrolyte as a function of relative density (compared to the electrolyte density) and diffusion kinetics of dissolved positive electrode species in the electrolyte, limiting a size or volume of the negative electrode, allowing the cell to periodically rest in a discharged state while held at a voltage below the Type 2 mode open circuit voltage (OCV), operating a cell at lower charge capacity, and operating the cell in both Type 1 and Type 2 modes of operation. Some or all of these approaches may aid in improving cell performance and minimizing the occurrence of cell failure of Type 1 cells during Type 2 mode of operation, or Type 2 cells during Type 2 mode of operation.

In some situations, the positive electrode can include a plurality of components or materials (e.g., Pb and Sb). One of the components (or materials) can have a less negative $\Delta G_f$ with halide salts in the electrolyte than the other component(s). For example, if the positive electrode comprises Pb and Sb, Sb has a more negative $\Delta G_f$ with halide salts in the electrolyte than Pb. The presence of an alloying metal can lower the activity of Pb in the positive electrode. In such circumstances, during charging, any droplets comprising a material of the positive electrode (e.g., Pb) that form in the electrolyte may have a higher activity than the material in the positive electrode, which, in some cases, may provide a driving force that, over time, dissolves the droplets in the electrolyte and deposits the droplets in the positive electrode. Such configuration may be practical for both Type 2 cells and Type 1 cells operated in Type 2 mode. Thus, alloying a positive electrode material (e.g., Sb) with a less electronegative positive electrode material (e.g., metal or metalloid such as Pb) can be used to decrease or prevent build-up of small particles of either positive electrode material (e.g., Sb or Pb) from accumulating in the electrolyte.

Such accumulation of particles or phases may in some cases lead to electronic shorting between the electrodes through the electrolyte.

The thickness of the electrolyte may be selected to improve cell performance and operating lifetime. In some cases, the thickness of the electrolyte layer can be selected to minimize, if not substantially prevent, material of the positive electrode from diffusing into the negative electrode during cell operation, such as cell charging. The thickness of the electrolyte may be selected to decrease the rate at which material of the positive electrode diffuses into the negative electrode during cell operation, such as cell charging and/or discharging, and may be a function of diffusion kinetics and relative density of the positive electrode ion species dissolved into the electrolyte.

In some examples, the electrolyte can have a thickness (measured as the distance between negative electrode/electrolyte and positive electrode/electrolyte interfaces) of at least about 0.01 cm, 0.05 cm, 0.1 cm, 1 cm, 2 cm, 3 cm, 4 cm, 5 cm, 6 cm, 7 cm, 8 cm, 9 cm, 10 cm, 20 cm, 30 cm, 40 cm, 50 cm for a cell having a thickness of at least about 1 cm, 2 cm, 3 cm, 4 cm, 5 cm, 6 cm, 7 cm, 8 cm, 9 cm, 10 cm 20 cm, 30 cm, 40 cm, 50 cm, 60 cm or more. In some examples, a cell has a thickness of at most about 3 cm or 4 cm, and an electrolyte with a thickness of at most about 1 cm or 2 cm.

As an alternative, or in addition to, the size (e.g., volume) of the negative electrode can be selected such that, upon cell charging, the negative current collector (e.g., metallic foam, or a tungsten current collector or lead) becomes nearly, substantially, or completely full of the negative electrode material (e.g., Li or Na) such that if there is any additional material from the electrolyte or positive electrode (e.g., Zn), it may overflow and not react with, or deposit into, the negative electrode. In an example, a cell comprises a negative electrode comprising Li or Na and a positive electrode comprising Zn. Since Zn is heavier (or more dense) than Li or Na, a Zn—Na or Zn—Li alloy may drip or flow off the bottom of the negative electrode (i.e., along the direction of the gravitational acceleration vector) and recombine with the positive electrode. This can aid in naturally cleansing the negative electrode of any Zn, such as, for example, in cases in which the Zn alloy is relatively anti-wetting/immiscible with the negative electrode material.

In an example, in a Type 2 cell chemistry, the negative electrode and the positive electrode materials may form an immiscible mixture (e.g., of Na-rich and Zn-rich composition). The immiscible mixture may promote the positive electrode material rich mixture to drip off the negative electrode and rejoin the positive electrode, thereby recovering cross-contaminated cathode material.

In some cases, a cell can be periodically permitted to rest in a discharged state under voltage that is below the open circuit voltage (OCV) in Type 2 mode. This approach can provide an opportunity for any droplets, comprising positive electrode material, that may have formed in the electrolyte or negative current collector to settle down to the positive electrode and recombine with the positive electrode material. In an example, a cell comprises a negative electrode comprising Li or Na and a positive electrode comprising Pb. During charging under Type 2 mode, Pb droplets form in the electrolyte. Subsequent to discharging, the cell is permitted to rest for a given time period at an applied voltage. In such a case, Pb droplets that have formed in the electrolyte settle down (i.e., along the gravitational acceleration vector) to the positive electrode, where they can recombine with the positive electrode.

In some cases, a cell can be operated at a lower charge capacity with respect to a maximum charge capacity of the cell, which can limit the quantity of positive electrode material that may dissolve in the electrolyte. In some examples, a cell can be operated at a charge capacity that is about 95%, 90%, 80%, 70%, 60%, 50%, 40%, 30%, 10%, 5% of the maximum charge capacity.

In some cases, a cell can be operated in both a high voltage (Type 2) operating mode and the low voltage (Type 1) operating mode. This may provide a driving force for the material of the positive electrode (e.g., $Pb^{2+}$) to redeposit onto the positive electrode during the Type 1 mode, which can help minimize, if not prevent, the material of the positive electrode form depositing in the electrolyte or the negative electrode.

A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V).

During cell operation, material (e.g., Fe) from a wall of the cell can react under the higher voltage potential (e.g., Type 2 mode), and ionize as a soluble species in the electrolyte. Hence, the wall material can dissolve into the electrolyte and subsequently interfere with the cell's electrochemistry. For example, the dissolved material can deposit on the negative electrode, which, in some cases, can grow as dendrites and stretch across the electrolyte to one or more walls of the cell, or toward the positive electrode, which can result in a short failure. The present disclosure provides various approaches for suppressing or otherwise helping minimize the dissolution of solid (passive) cell material such as Fe and its potentially negative effects on cell performance by, for example, formation of dendrites and cell shorting. In some cases, a cell can be designed such that increased spacing between the negative electrode and a wall of the cell suppresses or otherwise helps minimize the ability of dendrites from forming and shorting the wall to the inner wall. A cell can include an electrically insulating, and chemically stable sheath or coating between one or more walls of the cell and the negative electrode, electrolyte and/or positive electrode to minimize or prevent shorting to the one or more walls of the cell. In some cases, the cell can be formed of a non-ferrous container or container lining, such as a carbon-containing material (e.g. graphite), or a carbide (e.g., SiC, TiC), or a nitride (e.g., TiN, BN), or a chemically stable metal (e.g., Ti, Ni, B). The container or container lining material may be electrically conductive. Such non-limiting approaches can be used separately or in combination, for suppressing or otherwise helping minimize chemical interactions with Fe or other cell wall materials, and any subsequent negative effects on cell performance.

Cross-contamination of positive electrode species (e.g., Zn) on the negative electrode can result in the accumulation of the positive electrode species (e.g., Zn) on the negative electrode. This can reduce the cell voltage because the negative electrode species (e.g., Li) in the negative electrode is alloyed with the positive electrode species (e.g., Zn) instead of being in a pure state. As the negative electrode species (e.g., Zn) is deposited onto the negative electrode, it can reduce the amount of negative electrode species (e.g., Zn) that can be used as the negative electrode material, thus reducing the effective capacity of the cell.

If a sufficient amount of the negative electrode species (e.g., Zn) accumulates on the negative electrode (e.g., due to cross-contamination mechanisms for Type 2 cells), it may drip down into the electrolyte and contact the positive electrode, thus shorting the cell. In some cases, the positive electrode species lost to the negative electrode may be at least partially recovered by placing (or keeping) the negative current lead or collector sufficiently far above the positive electrode such that a droplet of the positive electrode species (e.g., Zn metal or a Zn-rich alloy) may drip off the negative electrode and recombine with the positive electrode. However, in this configuration, the spacing required between the negative current collector and the positive electrode may result in increased cell resistance and reduced cell efficiency.

In some implementations, such as, for example, in Type 2 cell chemistries, the positive electrode comprises a high density positive electrode material (e.g., a metal such as Pb) that forms a higher density salt layer that resides adjacent the positive electrode (e.g., directly above the positive electrode or at an interface between the positive electrode and the electrolyte). For example, Pb may mix with the electrolyte salt adjacent the positive electrode to create a separate layer between the positive electrode and the electrolyte. The separate layer may have a higher density that the electrode farther away from the positive electrode. Thus, in some cases, the separate layer may sink in a vertical direction to the bottom of the electrolyte. In some cases, this layer can help prevent cross-contamination of the cation of the positive electrode (e.g., $Pb^{3+}$) from migrating up to the negative electrode.

As previously described, during operation of a cell (e.g., under Type 2 mode), material of the positive electrode (e.g., cathode during discharge) may dissolve in the electrolyte (e.g., as cation species) and in some cases migrate to the negative electrode (e.g., anode during discharge). In some implementations, such as, for example, when operating Type 2 cells, this migration may be at least partially controlled, limited or prevented through use of a species selective membrane (also "membrane" herein). The membrane may selectively allow negative electrode cation species (e.g., $Li^+$ ions) to pass across the membrane (e.g., from the negative electrode side to the positive electrode side during discharge, or from the positive electrode side to the negative electrode side during charge) while preventing positive electrode cation species (e.g., $Zn^{2+}$ ions) from passing across the membrane from the positive electrode side to the negative electrode side. For example, in a Type 2 cell, positive electrode cations can still dissolve into the electrolyte during charge and deposit as neutral species in the positive electrode during discharge, but they can be confined to the portion of the electrolyte that is adjacent the positive electrode. Thus, the membrane may at least partially control, limit, or prevent reduction of the positive electrode ions at the negative electrode surface (e.g., during discharge, charge, or both), thereby at least partially controlling, limiting or preventing electrode cross-contamination and/or reduction in the performance of the cell (or battery).

In some examples, the membrane can be inserted into the system (e.g., into the cell). In some cases, the membrane may be inserted into the cell upon cell assembly. When deployed (i.e., in an active position), the membrane provides a liquid tight barrier between the electrolyte that is in contact with the negative electrode and the electrolyte that is in contact with the positive electrode.

The membrane may be positioned (e.g., locked in position, or formed) within the electrolyte. In some cases, the membrane may be suspended in the electrolyte such that it is electrically insulated from the positive electrode and/or the negative electrode (e.g., the membrane may be provided at a floating potential). In some cases, the membrane may be mechanically coupled to a portion of the cell housing or container (e.g., an insulating portion). The membrane may alternatively be provided at an interface between the positive electrode and the electrolyte (e.g., electrically and/or mechanically coupled to the positive electrode), or at an interface between the negative electrode and the electrolyte (e.g., electrically and/or mechanically coupled to the negative electrode). In some implementations, the membrane may be provided as a coating (e.g., on the negative electrode, on the positive electrode, or both). Any aspects of the disclosure (e.g., location, position, physical or chemical characteristics) described in relation to intermetallic layers formed during cell operation may equally apply to membrane inserts at least in some configurations.

In some implementations, such a cell design may allow separate portions of the electrolyte to be formed. For example, a first portion of the electrolyte that is in contact with the positive electrode may comprise a lower concentration of dissolved positive electrode cations than a second portion of the electrolyte that is in contact with the negative electrode. As previously described, the concentration of the cations of the positive electrode material can vary in vertical proximity within the electrolyte (e.g. as a function of distance above the positive electrode material). Thus, the membrane can further enhance this stratification relative to a configuration where the membrane is not provided (e.g., there may be a step change in positive electrode cations at the membrane interface). Further, in some cases, this step change or stratification may only occur during the portions of cell cycling when the membrane is deployed within the cell. The negative electrode cation concentration may or may not be the same in the first and second portions. In an example, the negative electrode cation concentration is substantially the same in both portions of the electrolyte during membrane deployment. The membrane may or may not be permeable to anions and/or cations of the electrolyte salt. In an example, the concentration of ionic species of the electrolyte salt is substantially the same in both portions of the electrolyte during membrane deployment.

In an example, the membrane is present in the cell during charging and discharging. During the charging, cations of the positive electrode material dissolve into the electrolyte the positive electrode side of the membrane and deposit in the positive electrode upon discharging, but do not cross over to the negative electrode side of the membrane. Thus, in this configuration, unless cations of the positive electrode material are initially present in the electrolyte when the membrane is inserted into the cell, only the electrolyte on the positive electrode side comprises (e.g., in a partially charged or discharged state) a substantial (or any) amount of cations of the positive electrode material.

In an example, a graphite membrane is incorporated in an electrochemical cell comprising a graphite crucible (e.g., to protect a stainless steel cell body from attach or corrosion), a housing with a stainless steel body, and a thin layer of lead between the graphite crucible and the body of the housing (e.g., to facilitate electron current flow). The graphite membrane can be, for example, less than or about 1/16 or 1/8 inches thick. In this configuration, the membrane can be, for example, wedged, slid, interlocked or otherwise mechanically coupled to graphite crucible. In some cases, the membrane can be integrally formed with at least a portion of the housing and/or the crucible. In some cases, the membrane can be suspended into the electrolyte in the cell from a cell or housing lid (e.g., mechanically detached from the graphite crucible). In some cases, the membrane can be provided as an inverted cup (e.g., inverted graphite cup) in the cell.

The membrane (e.g., a solid membrane) may enable the diffusion of the negative electrode metal cation, but not the positive electrode metal cation. The membrane can be formed of a material that exhibits a high diffusivity of atoms and/or ions of the negative electrode active material (e.g., alkali or alkaline earth metal, such as Li, Mg, etc.) and a low diffusivity of cations of the positive electrode material. In some examples, such materials may have diffusivities of atoms and/or ions of the negative electrode active material of at least about $10^{-8}$ cm$^2$/s, $10^{-7}$ cm$^2$/s, $10^{-6}$ cm$^2$/s, $10^{-5}$ cm$^2$/s, $10^{-4}$ cm$^2$/s, $10^{-3}$ cm$^2$/s, $10^{-2}$ cm$^2$/s, and the like. In some examples, the membrane can be graphite or another material with a diffusivity of at least about $10^{-8}$ cm$^2$/s, at least about $10^{-6}$ cm$^2$/s, at least about $10^{-4}$ cm$^2$/s, or at least about $10^{-2}$ cm$^2$/s. In some examples, the membrane can have a thickness of less than about 1 mm, less than about 0.1 mm, or less than about 0.01 mm. In some cases, the membrane can be a graphite foil with a thickness of less than about 1 mm, less than about 0.1 mm, or less than about 0.01 mm. In some examples, the membrane can have a diffusivity of at least about $10^{-8}$ cm$^2$/s, at least about $10^{-6}$ cm$^2$/s, at least about $10^{-4}$ cm$^2$/s, or at least about $10^{-2}$ cm$^2$/s, and a thickness of less than about 1 mm, less than about 0.1 mm, or less than about 0.01 mm.

In some implementations, the membrane can enable a cell to reach a given (e.g., higher) current density. For example, the membrane may enable a steady state current density of a cell of at least about 50 mA/cm$^2$, at least about 100 mA/cm$^2$, at least about 200 mA/cm$^2$, or at least about 500 mA/cm$^2$. The current density may be maintained during a given period of time. For example, the current density can be maintained for at least about 10 minutes, at least about 20 minutes, at least about 40 minutes, at least about 60 minutes, at least about 2 hours, at least about 3 hours, or at least about 4 hours. In some examples, the membrane may enable a steady state current density of a cell of at least about 50 mA/cm$^2$, at least about 100 mA/cm$^2$, at least about 200 mA/cm$^2$, or at least about 500 mA/cm$^2$ for at least about 10 minutes, at least about 20 minutes, at least about 40 minutes, at least about 60 minutes, at least about 2 hours, at least about 3 hours, or at least about 4 hours.

In some implementations, graphite may be used as a negative electrode species (e.g., lithium) selective membrane (e.g., with a lithium diffusivity of about $10^{-6}$ to $10^{-8}$ cm$^2$/s). In such configurations, a thinner graphite membrane may be supported by a porous mechanical structure (e.g., graphite, carbides such as tungsten carbide (WC), silicon carbide (SiC), titanium carbide (TiC) that are stable in the presence of molten negative electrode material such as, for example, lithium, mixtures/alloys of such carbides with carbides of the negative electrode species, such as, for example, lithium carbide, etc.), thereby reducing the diffusion path through the membrane. Illustrative examples of graphite materials are described in Ping Yu et al., "Determination of the Lithium Ion Diffusion Coefficient in Graphite," Journal of The Electrochemical Society, 146 (1) 8-14 (1999), and B. Jungblut and E. Hoinkis, "Diffusion of lithium in highly oriented pyrolytic graphite at low concentrations and high temperatures," Phys. Rev. B 40, 10810 (December 1989), each of which is entirely incorporated herein by reference.

In some implementations, the membrane (e.g., graphite-based material) can be structurally modified to effectively increase its surface area (e.g., 4-10 times as much effective surface are) and/or to make the membrane mechanically stronger. In some cases, the membrane (e.g., solid membrane) can be supported with mechanical scaffolding to improve structural stability while enabling high diffusivity. For example, patterned, honeycomb, twisted, grooved, winding, zigzag or other structures can be used. In one example, a grid pattern with thick cross members can be used to enhance strength. In another example, patterned units (e.g., squares, circles, irregular shapes, grooves with varying densities, etc.) are stamped or formed in the membrane in a repeating fashion. In yet another example, the pattern is the same over the entire membrane surface.

The present disclosure further provides methods for reversing the deposition of material of the positive electrode (e.g., cathode during discharge) into the negative electrode (e.g., anode during discharge) or alloying with the material of the negative electrode. In some implementations, conditioning (also "reconditioning" or "recovering" herein), may be used for removing cross-contaminated positive electrode material. The conditioning process may be used, for example, in high voltage cell (Type 2) chemistries. The conditioning process may utilize electrochemical stripping of the cross-contaminated positive electrode material. The cross-contaminated positive electrode material (e.g., one or more positive electrode species, such as, for example, Zn) can be electrochemically stripped from the negative electrode (e.g., the negative current collector) by holding the electrochemical cell at a sufficiently negative voltage (also "conditioning voltage" herein) and providing sufficient current flow through the cell to maintain the conditioning voltage. The positive electrode species is driven to dissolve from the negative electrode into the electrolyte and to subsequently accept electrons from the positive electrode and be redeposited into the positive electrode, thus returning the cell to its original configuration and avoiding cell performance deterioration and cell failure mechanisms. During the conditioning, the cell can be discharged to sufficiently negative voltages by driving the positive electrode (e.g., the electrode 305 in FIG. 3) to a potential that is more negative than the negative electrode (e.g., the electrode 303 in FIG. 3). Thus, the actual polarity of the electrodes is reversed during the conditioning process (i.e., the negative electrode becomes more positive than the positive electrode).

For example, in Type 2 cells such as Li∥Zn or Li∥Zn—Sn, described in greater detail elsewhere herein, cross-over of the positive electrode material (e.g., Zn) and contamination of the negative electrode may result in the loss of the positive electrode material (e.g., Zn) from the positive electrode and accumulation of the positive electrode material (e.g., Zn) at the negative electrode. This cross-contamination can reduce cell voltage, lower cell capacity and/or limit (or constrain) spacing of the electrodes. The conditioning described herein can bring the cell back to its original state (e.g., after every cycle). In some cases, conditioning can reduce any capacity lost due to deposition of the positive electrode material on the negative electrode or negative current collector. In some cases, conditioning may mitigate, limit or avoid cell failure (e.g., avoid cell failure mechanisms such as dendrite growth).

In an example, in a Li∥Zn—Sn cell, Zn serves as the positive electrode. During the charging process, Zn dissolves into the electrolyte as $Zn^{2+}$, while $Li^+$ ions are reduced at the negative electrode and deposit as Li metal. During operation (e.g., during discharge, charge, or both), some $Zn^{2+}$ diffuses through the electrolyte to the negative electrode. At the negative electrode, the $Zn^{2+}$ is reduced by Li metal and deposits on the negative current collector. For example, Zn may deposit onto the negative electrode after charging (e.g., $Zn^{2+}+2Li \rightarrow Zn+2Li^+$). During the discharging process, the Li dissolves back into the electrolyte as $Li^+$, but the Zn may remain on the negative current collector.

Figure 11:
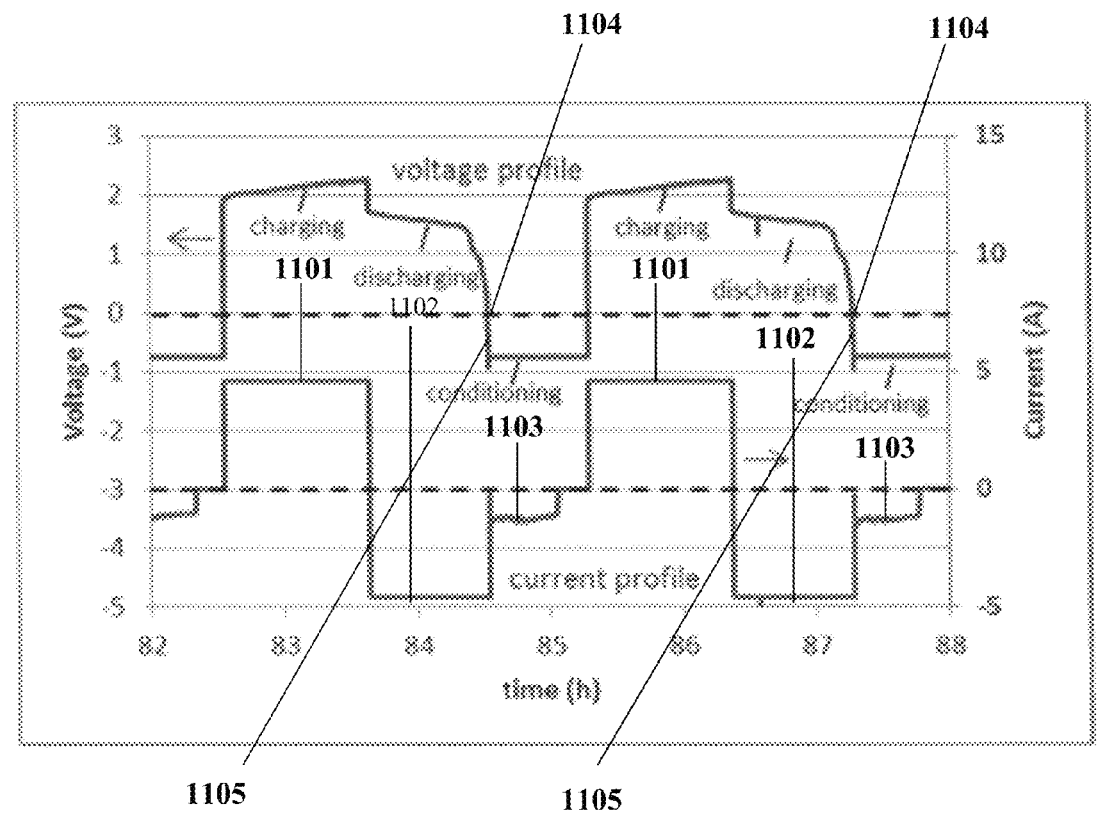
FIG. 11 shows examples of voltage and current profiles during charging, discharging and conditioning.

FIG. 11 shows examples of voltage (top) and current (bottom) profiles during charging 1101, discharging 1102 and conditioning 1103 in a Li∥Zn or Li∥Zn—Sn cell. A conditioning step can be implemented after the end of the discharge process (e.g., after all the Li has been discharged off the negative current collector). In some cases, the battery or cell may be discharged fully. After fully discharging the battery (1104), the cell voltage may be close to about 0 V, and the negative electrode may be substantially depleted of Li. In the discharged state, the electrolyte may be substantially free of $Zn^{2+}$ ions. The conditioning step comprises bringing the cell to a negative voltage 1105. During the conditioning, the cell is discharged to sufficiently negative voltages by driving the positive electrode (e.g., the electrode 305 in FIG. 3) to a potential that is more negative than the negative electrode (e.g., the electrode 303 in FIG. 3) such that Zn on the negative electrode is oxidized to $Zn^{2+}$ and dissolves into the electrolyte. Simultaneously, at sufficiently negative cell voltages, $Zn^{2+}$ ions from the electrolyte are reduced at the positive electrode, re-depositing onto the positive electrode. In some cases, the conditioning process may initially occur via dissolution of the Zn at the negative electrode and the simultaneous deposition of Li into the positive electrode from $Li^+$ in the electrolyte.

During the conditioning, Zn contaminating the negative electrode is electrochemically stripped back into the electrolyte and re-deposited into the positive electrode, thus returning the cell to its original configuration. In some implementations, cell conditioning can return at least about 75%, 80%, 85%, 90%, 95%, or more of the positive electrode material deposited or alloyed with the negative electrode back to the positive electrode.

During practical operation, the conditioning step may be implemented at cell voltages below a theoretical voltage for the stripping reaction. In an example, during conditioning in Li∥Zn or Li∥Zn—Sn cells, the cells undergo electrode reactions $Zn \rightarrow Zn^{2+}+2e^-$ at the negative electrode and $Zn^{2+}+2e^- \rightarrow Zn$ at the positive electrode. In this case, the electrode reactions are balanced and a negative voltage close to 0 V is expected. In practice, the conditioning voltage 1105 is about −0.75 V or less. The overpotential needed to drive the cell (e.g., to facilitate current flow) during conditioning may be due to the initial dissolution of the $Zn^{2+}$ at the negative electrode and the simultaneous deposition of Li into the positive electrode until the electrolyte has a sufficient quantity of $Zn^{2+}$ to enable the balanced reaction, as previously described. In some cases, once the electrolyte is populated with $Zn^{2+}$ ions, the process may occur at negative voltages closer to 0 V. In some cases, a given quantity of a zinc salt (e.g., $ZnCl_2$), may be added to the electrolyte to initially populate the electrolyte with $Zn^{2+}$ ions.

Further, while a sufficiently negative cell voltage may be needed to dissolve $Zn^{2+}$ ions into the electrolyte to initiate and/or enable conditioning to proceed at a given rate (e.g., more negative voltage may result in faster conditioning), the cell voltage may not be driven toward too negative values. In some cases, negative cell voltages below a given value can cause the negative current collector (e.g., tungsten, tungsten carbide or molybdenum negative collector not comprising Fe—Ni foam) to also dissolve into the electrolyte. For example, below about −0.75 V, tungsten (W) may be reduced to $W^{2+}$ and dissolved in the electrolyte (e.g., as tungsten chloride ($WCl_2$)). In other examples, the voltage may be limited by other redox reactions of the negative current collector (e.g., reactions with chlorides to form other tungsten chloride species, reactions with other electrolyte components, such as, for example, fluorides, bromides or iodides, etc.).

In some examples, electrochemical cells of the disclosure can operate at a conditioning voltage of less than or equal to about 0 V, −0.1 V, −0.2 V, −0.3 V, −0.4 V, −0.5 V, −0.6 V, −0.7 V, −0.75 V, −0.8 V, −0.9 V, −1 V, −1.1 V, −1.2 V, −1.3 V, −1.4 V, −1.5 V, −1.6 V, −1.7 V, −1.8 V, −1.9 V, −2 V, −3 V, −4 V, −5 V, and the like. In some examples, electrochemical cells of the disclosure can operate at a conditioning voltage greater than or equal to about −5 V, −4 V, −3 V, −2 V, −1.9 V, −1.8 V, −1.7 V, −1.6 V, −1.5 V, −1 V, −0.9 V, −0.8 V, −0.75 V, −0.7 V, −0.6 V, −0.5 V, −0.4 V, −0.3 V, −0.2 V, −0.1 V, and the like. In an example, a conditioning voltage of an electrochemical cell is between about −0.75 V and −0.4 V, or about −0.75 V. In some cases, current flows during the conditioning process until the cross-contaminated positive metal on the negative electrode has fully redeposited into the positive electrode, at which point the current substantially decreases even while the cell voltage is still held at the conditioning voltage.

In some examples, at least a portion of discharging may be a performed as part of the conditioning process. For example, electrochemical cells can be discharged to a voltage of at most about 0.5 V, 0.4 V, 0.3 V, 0.2 V, or 0.1 V. Further discharging to zero and negative voltages may be performed as part of the conditioning process. In some cases, if conditioning is not performed, the electrochemical cell may not be further discharged.

In some examples, the conditioning process may be allowed to proceed until a given current value is obtained. For example, the conditioning process may be allowed to proceed until the current, at the conditioning voltage, approaches or reaches about 0 V. In some implementations, the conditioning voltage may be varied during the conditioning process.

Conditioning can be readily applied to cells or batteries with various cell chemistries. In an example, the conditioning is implemented in the cells of FIG. 11 operated at 500° C. to 550° C. The cells comprise a graphite crucible (the graphite crucible protecting the iron (Fe) in the stainless steel cell body), a tungsten (W) rod as the negative current collector, 5 Ah and 10 Ah, respectively, of Zn, and about 300 g of a LiF:LiCl:LiBr salt electrolyte with 25:55:20 mol % ratio. The cells are assembled at room temperature, heated to 550° C. with internal cavities of the cells under vacuum, and backfilled with argon before charging. The cut-off voltage is set to about 2.5 V to 3.3 V and the discharge cut-off limit is set to −0.75 V. At −0.4 V, no reactions are observed. When the cell is held at −0.75 V, the reaction process 1103 starts off at a slow rate, increases its rate/current and then drops back to about zero current when all the Zn on the negative electrode is consumed.

Type 2 Chemistries

Another aspect of the present disclosure provides Type 2 cell chemistries. In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode. During operation at an operating temperature of the Type 2 cell, the Type 2 cell can have a negative electrode, electrolyte and positive electrode in a liquid (or molten) state. A cell can include components that are solid or semi-solid, such as a solid intermetallic layer between the electrolyte and the positive electrode. Products of the electrochemical cycle may include the formation of alloyed species that may be liquid, semi-liquid, or solid, and may be soluble and/or immiscible with the electrode materials and/or the electrolyte salt. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

A Type 2 cell operating in Type 2 mode can have components (e.g., negative electrode, electrolyte, positive electrode) that are fully liquid. A Type 2 cell operating in Type 2 mode can have solid or semi-solid components, such as an intermetallic.

A cell with a Type 2 chemistry can include a molten alkali or alkaline earth metal (e.g., lithium, magnesium, sodium) negative electrode and an electrolyte adjacent to the negative electrode. The electrolyte can include a halide salt (e.g., LiF, LiCl, LiBr, $MgCl_2$, NaI). The electrolyte can comprise a mixture of salts (e.g., 25:55:20 mol % LiF:LiCl:LiBr, 50:37:14 mol % LiCl:LiF:LiBr, etc.). The cell with a Type 2 chemistry can include a molten metal positive electrode comprising one or more transition metals. In some cases, the positive electrode comprises zinc (Zn), cadmium (Cd) and mercury (Hg) or combination thereof, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise 15:85, 50:50, 75:25 or 85:15 mol % Zn:Sn.

In some examples, the electrolyte may comprise two or more phases. In some cases, formation of an additional phase (e.g., a solid phase or a second liquid phase) may suppress species cross-over (e.g., $Zn^{2+}$ containing salt crossing over from near the positive electrode to the negative electrode). Phase separation may result in formation of inter-salt compounds (e.g. compounds formed from of $ZnCl_2$ and LiCl, etc.). In one example, operating temperature can be reduced to suppress $Zn^{2+}$ solubility in a Li-halide salt phase in contact with the negative electrode (e.g., phase formed due to stratification of two electrolyte phases). Solubility of Zn metal in Li-halide salts may be negligible in some cases. In another example, a solid Zn-halide salt can be formed adjacent to (e.g., in the vicinity of or in contact with) the positive electrode. In yet another example, viscosity of the electrolyte salt can be increased to suppress thermally driven convection of given species (e.g., salt comprising Zn-halide) toward the negative electrode (e.g., vertically upward to the negative electrode). The electrolyte may comprise salts of the positive electrode species. Such salts may be formed as the positive electrode species dissolves into the electrolyte (e.g., during charging). In some cases, such salts (e.g., $ZnCl_2$) may suppress a melting point of the electrolyte.

In some cases, a Type 2 cell can operate at a voltage of at least about 0.5 V, 1 V, 1.5 V, 2 V, 2.5 V, or 3 V in a charged state. In some cases, a Type 2 cell can have an open circuit voltage (OCV) of at least about 0.5 V, 1 V, 1.5 V, 2 V, 2.5 V, or 3 V. In an example, a Type 2 cell has an open circuit voltage greater than about 1 V, greater than about 2 V, or greater than about 3 V. In some cases, a charge cutoff voltage of a Type 2 cell is from about 1 V to 3 V, 1.5 V to 2.5 V, 1.5 V to 3 V, or 2 V to 3 V in a charged state. The operating voltage of a Type 2 cell can be from about 1 V to 2 V, 1 V to 3 V, 1.5 V to 2.5 V, 1.5 V to 3 V, or 2 V to 3 V in a charged state. A Type 2 cell can provide such voltage(s) upon operating at up to and exceeding about 10 cycles, 20 cycles, 30 cycles, 40 cycles, 50 cycles, 100 cycles, 200 cycles, 300 cycles, 400 cycles, 500 cycles, 1000 cycles, 2000 cycles, 3000 cycles, 4000 cycles, 5000 cycles, 10,000 cycles, 20,000 cycles, 50,000 cycles, 100,000 cycles, 1000,000 or more cycles. In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container. A cell can be operated without a substantial decrease in capacity. The operating lifetime of a cell can be limited, in some cases, by the life of the container, seal and/or cap of the cell.

A Type 2 cell may have various advantages. For instance, a Type 2 cell may include one or more elements that are more abundant and readily accessible. A Type 2 cell may be less hazardous and toxic than other chemistries. In addition, some Type 2 chemistries can have valence states that help avoid, or minimize, oxidization and/or reduction ("redox") shuttling reactions which can reduce Coulombic efficiency. In some examples, the positive electrode can comprise a metal or metalloid that has only one stable oxidation state (e.g., a metal with a single or singular oxidation state). For example, the positive electrode (e.g., the active material in the positive electrode) may comprise a Group 12 element, such as zinc and/or cadmium, which may only exhibit a single valence state compared to transition metals (e.g., iron, cobalt, nickel) or metalloids (e.g., lead, antinomy). In some examples, the positive electrode may comprise a Group 12 element with a singular stable oxidation state (e.g., Zn or Cd). In some examples, the positive electrode may comprise a transition metal with a singular stable oxidation state. A Type 2 cell of the present disclosure can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 mA/cm$^2$, 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$.

Type 2 cells can have cell configurations and be included in energy storage systems of the present disclosure. A Type 2 cell can be provided in an energy storage device comprising at least 1, 2, 3, 4, 5, 6, 7, 8, 9, 10, 20, 30, 40, 50, 60, 70, 80, 90, 100, 200, 300, 400, 500, 1000, 10,000, 20,000, 50,000, 100,000, 500,000, or 1,000,000 cells, which may be Type 2 cells or a combination of Type 1 cells and Type 2 cells (e.g., 50% Type 1 cells and 50% Type 2 cells). Such cells can be operated under Type 2 mode. In some cases, a first portion of the cells may be operated in Type 1 mode, and a second portion of the cells may be operated in Type 2 mode.

In an example, a Type 2 cell comprises Li∥Zn. In a charged state, the Li∥Zn cell can have a cell voltage of at least about 1.0 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, the Li∥Zn cell has an OCV of about 1.86 V. A Li∥Zn cell can be operated at a temperature of at least about 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In an example, a Type 2 cell comprises Na∥Zn. In a charged state, the Na∥Zn cell can have a cell voltage of at least about 1.0 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, the Na∥Zn cell has an OCV of about 1.6 V. A Na∥Zn cell can be operated at a temperature of at least about 100° C., 150° C., 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In another example, a Type 2 cell comprises Li∥Zn—Sn. Here, Sn can be added to reduce the melting point of the positive electrode and reduce the activity of Zn in the positive electrode, which can provide a driving force for removing Zn droplets that may form in the electrolyte. In a charged state, the Li∥Zn—Sn cell can have a cell voltage of at least about 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. A Li∥Zn—Sn cell can be operated at a temperature of at least about 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In another example, a Type 2 cell comprises Na∥Zn—Sn. In a charged state, the Na∥Zn—Sn cell can have a cell voltage of at least about 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, V, or 3.0 V. A Na∥Zn—Sn cell can be operated at a temperature of at least about 100° C., 150° C., 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

Figure 12:
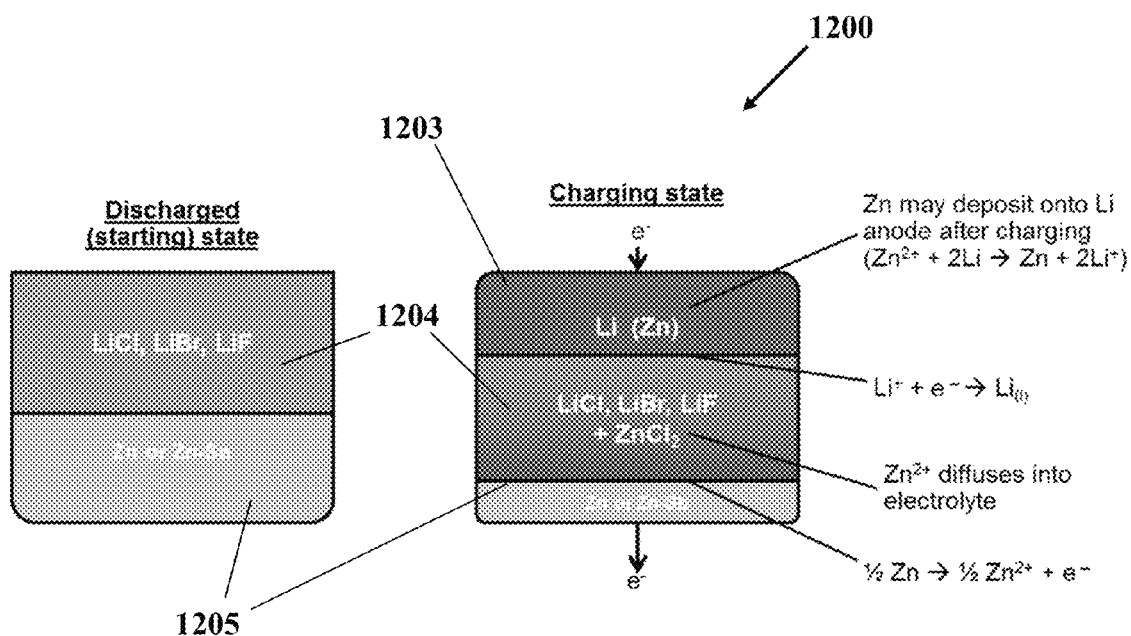
FIG. 12 is an example of a configuration of a cell at various states of charge.

FIG. 12 shows a configuration of a cell 1200 (e.g., the cell in FIG. 3) at various states of charge. The cell can be a Type 2 cell. The cell operation can involve addition of a positive electrode cation (e.g., $Zn^{2+}$) into electrolyte during the charging process. In this example, in a fully discharged state shown on the left, the cell comprises a positive electrode 1205 (e.g., Zn or Zn—Sn), but no negative electrode. The positive electrode 1205 can comprise a metal species (e.g., Zn). As previously described, alloying a positive electrode material (e.g., Zn) with a less electronegative positive electrode material (e.g., a metal or metalloid such as Sn) can be used to decrease or prevent build-up of small particles of either positive electrode material from accumulating in the electrolyte. In an example, a Type 2 cell comprises a positive electrode where Zn is alloyed with less electronegative Sn to prevent build-up of small particle of the cathode material from accumulating in the electrolyte.

The metal of the metalloid/cathode/positive electrode 1205 can dissolve into the electrolyte by losing electrons and becoming a positive ion (cation) through oxidation. In some cases, upon charging, the metal or metalloid in the positive electrode is reversibly directed into the electrolyte by losing electrons via an oxidation reaction. In some cases, upon charging, the alkali metal species is directed from the electrolyte (where it resides as a cation) and into the negative electrode as a neutral metal species.

In a partial state of charge shown on the right, the cell comprises at least a portion of a negative electrode 1203 (e.g., Li formed via reduction $Li^++e^-\rightarrow Li(liq)$, in some cases also Zn deposited onto the Li during or after charging via $Zn^{2+}+2Li\rightarrow Zn+2Li^+$) and at least a portion of the positive electrode 1205 (e.g., LiCl, LiBr, LiF and $ZnCl_2$ formed during charging as $Zn^{2+}$ diffuses into the electrolyte via oxidation $\frac{1}{2}Zn\rightarrow\frac{1}{2}Zn^{2+}+e^-$). The negative electrode 1203 is separated from the positive electrode 1205 by an electrolyte 1204. In a full state of charge, the cell comprises a full negative electrode and a depleted (e.g., partially or completely depleted) positive electrode. During the charging, the electrolyte changes composition (e.g., the amount $Zn^{2+}$ increases and the amount of $Li^+$ decreases, etc.) and may slightly change volume.

In some examples, a Type 2 cell (e.g., a Li∥Zn based cell such as, for example, the cell shown in FIG. 12) can comprise a protective and electrically conductive crucible or coating (e.g., graphite, SiC, TiC, or combinations thereof) to protect the cell housing. In some examples, the cell can include a negative current collector (not shown) comprising tungsten. In some cases, the negative current collector comprises tungsten to avoid corrosion from Zn. In some cases, such negative current collector may not dissolve into the electrolyte during conditioning processes (not shown in FIG. 12).

Energy Storage Systems and Computer Systems

Figure 6:
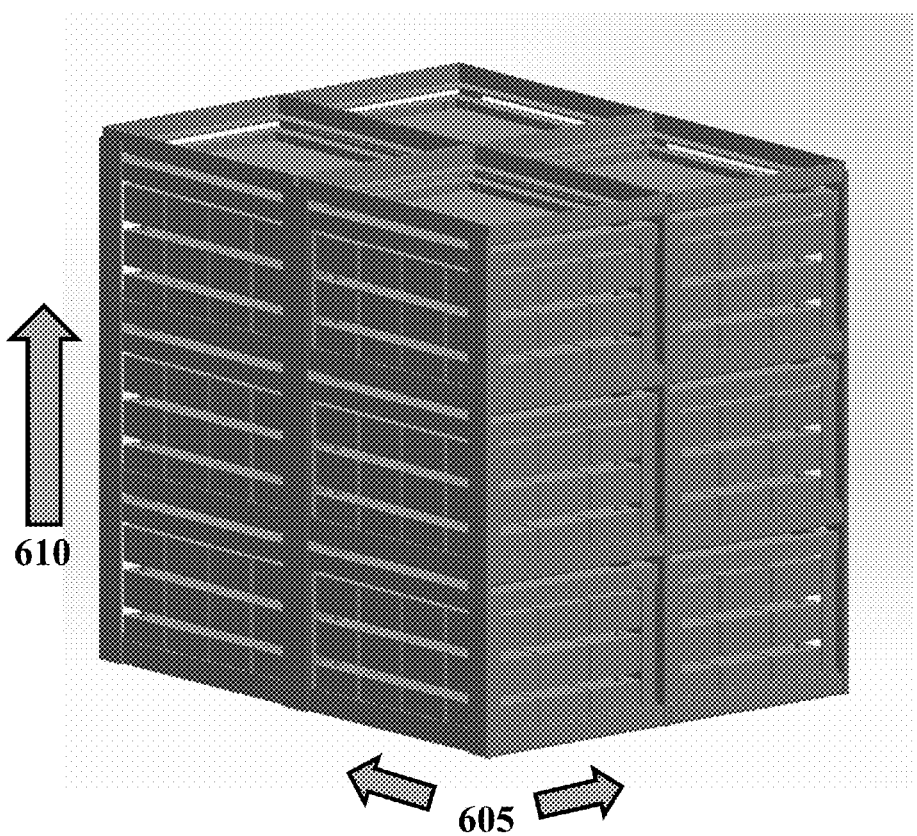
FIG. 6 is an illustration of an example of an energy storage system of the disclosure.

Electrochemical cells can be attached in series and parallel in various configurations to produce modules, packs, cores, aces, or electrochemical systems. The number and arrangement of various groups of electrochemical cells can be chosen to create the desired system voltage and energy storage capacity. The packs, cores, aces, or systems can then be enclosed together in high temperature insulation to create a system that can heat itself using the energy created from cells charging and discharging. For example, FIG. 6 is an example of how these packs can be configured, indicating that the cell packs in a given plane are connected to one another in parallel 605, while the packs connected directly atop one another are connected in series 610.

The packs themselves can be connected vertically and horizontally to one another through busbars (e.g., unlike the cell-to-cell connections within a pack which are generally direct connections such as brazes). In some cases, the busbar is flexible or comprises a flexible section (e.g., due to the non-isothermal expansion of the system throughout heat up and operation).

Also provided herein are control systems including computers programmed to control an energy storage system of the disclosure. An energy storage system can include an electrochemical energy storage device with one or more electrochemical energy storage cells. The device can be coupled to a computer system that regulates the charging and discharging of the device. The computer system can include one or more computer processors and a memory location coupled to the computer processor. The memory location comprises machine-executable code that, upon execution by the computer processor, implements any of the methods above or elsewhere herein.

An energy storage system can include an electrochemical energy storage device with one or more electrochemical energy storage cells. The device can be coupled to a computer system that regulates the charging and discharging of the device. The computer system can include one or more computer processors and a memory location coupled to the computer processor. The memory location comprises machine-executable code that, upon execution by the computer processor, implements any of the methods above or elsewhere herein.

Figure 7:
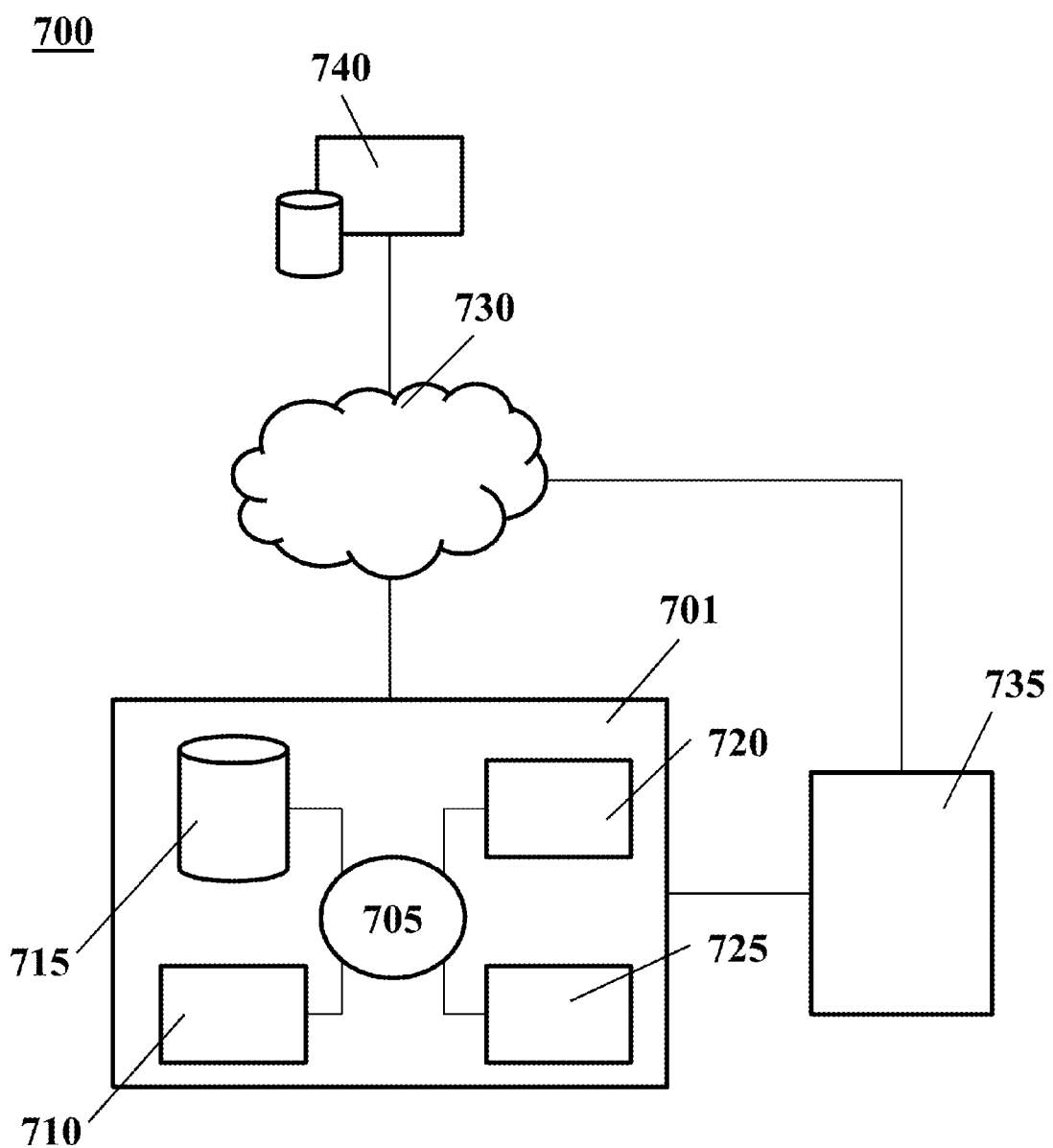
FIG. 7 shows a system programmed or otherwise configured to control or regulate one or more process parameters of an energy storage system of the present disclosure.

FIG. 7 shows a system 700 programmed or otherwise configured to control or regulate one or more process parameters of an energy storage system of the present disclosure. The system 700 includes a computer server ("server") 701 that is programmed to implement methods disclosed herein. The server 701 includes a central processing unit (CPU, also "processor" and "computer processor" herein) 705, which can be a single core or multi core processor, or a plurality of processors for parallel processing. The server 701 also includes memory 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The server 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the server 701, can implement a peer-to-peer network, which may enable devices coupled to the server 701 to behave as a client or a server. The server 701 can be coupled to an energy storage system 735 either directly or through the network 730.

The storage unit 715 can store process parameters of the energy storage system 735. The process parameters can include charging and discharging parameters. The server 701 in some cases can include one or more additional data storage units that are external to the server 701, such as located on a remote server that is in communication with the server 701 through an intranet or the Internet.

The server 701 can communicate with one or more remote computer systems through the network 730. In the illustrated example, the server 701 is in communication with a remote computer system 740. The remote computer system 740 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 700 includes a single server 701. In other situations, the system 700 includes multiple servers in communication with one another through an intranet and/or the Internet.

Methods as described herein can be implemented by way of machine (or computer processor) executable code (or software) stored on an electronic storage location of the server 701, such as, for example, on the memory 710 or electronic storage unit 715. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710. Alternatively, the code can be executed on the second computer system 740.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the server 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

A person of skill in the art will recognize that the battery housing components may be constructed from materials other than the examples provided above. One or more of the electrically conductive battery housing components, for example, may be constructed from metals other than steel and/or from one or more electrically conductive composites. The present disclosure therefore is not limited to any particular battery housing materials.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

Example 1

In an example, a Type 2 cell comprises Li∥Zn. The cell can include a lithium halide salt electrolyte. The cell can provide an open circuit cell voltage of about 1.9 V in a charged state. A Li∥Zn cell can be operated at a temperature of about 400° C., or of about 500° C. In such a case, the negative electrode, electrolyte and positive electrode are in a liquid (or molten) state.

Example 2

Figure 9:
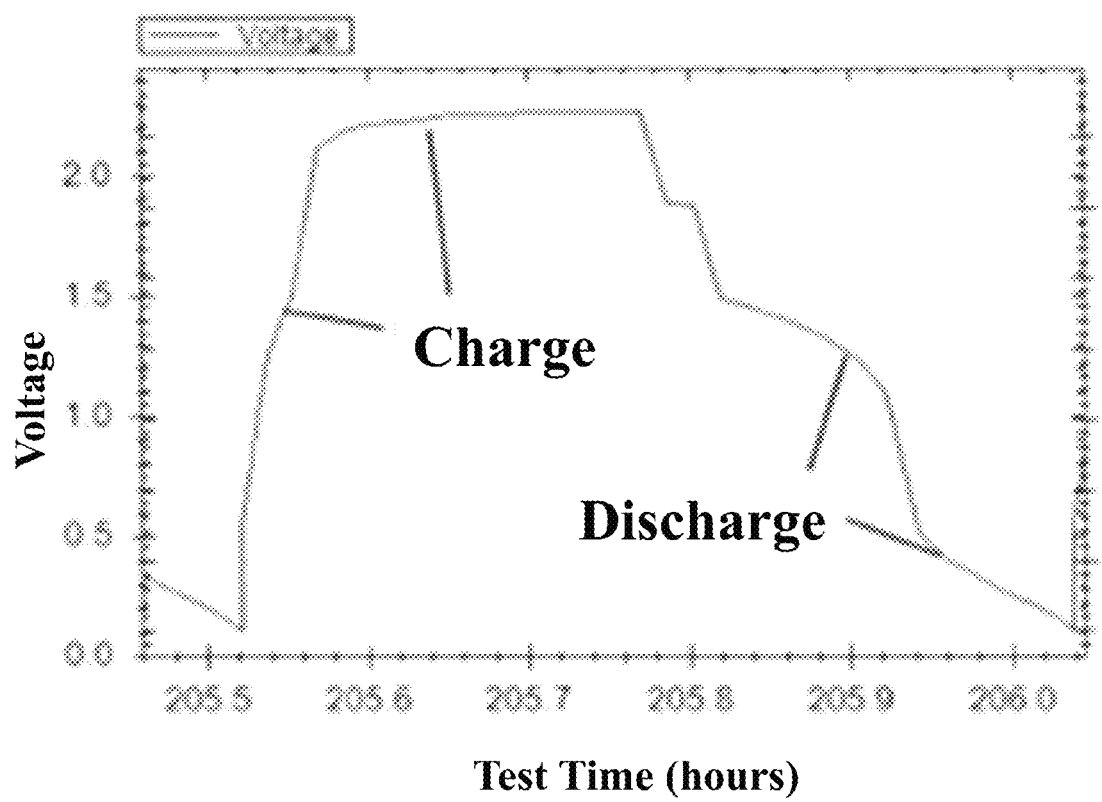
FIG. 9 shows a charge/discharge profile for the Li∥Zn—Sn cell of FIG. 8.

In an example, a Type 2 cell comprises a Li∥Zn—Sn. The cell can include a lithium halide salt electrolyte. FIG. 8 shows an example of operating conditions for a Li∥Zn—Sn cell. The cell comprises a lithium negative electrode (anode in the charged state), a LiF—LiCl—LiBr electrolyte, and a Zn—Sn positive electrode (cathode in the charged state). The respective compositions and amounts of the negative electrode, electrolyte and positive electrode are provided in FIG. 8. The operating temperature is about 500° C., the current density is about 200 mA/cm$^2$, the charge cutoff voltage is 2.5 V, the charge cutoff capacity is 2 Ah and the discharge cutoff voltage is 0.1 V. FIG. 9 shows a charge/discharge profile for the Li∥Zn—Sn cell of FIG. 8. Upon charging, a voltage of about 2.5 V is applied.

Figure 10A:
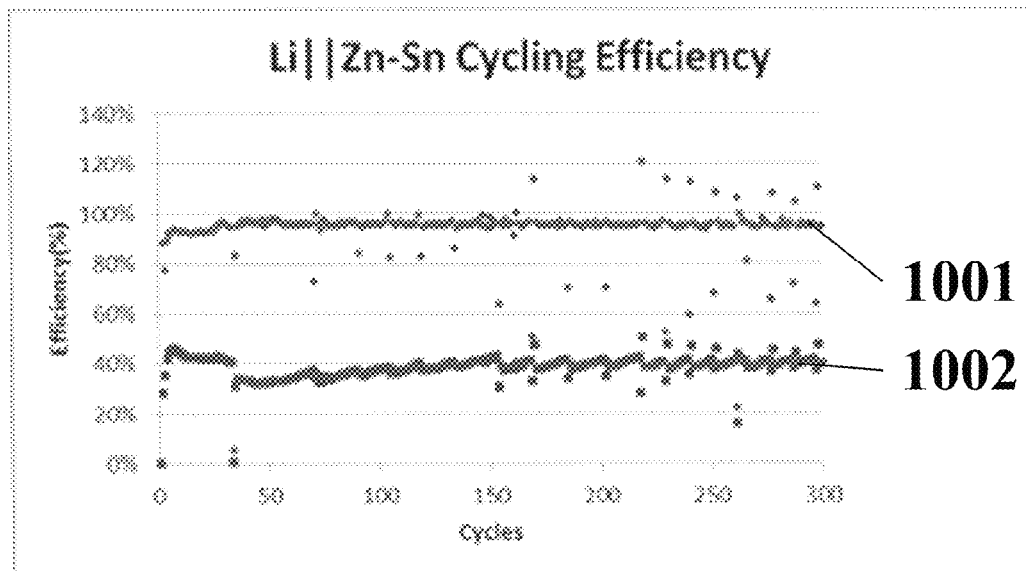
FIG. 10A is a plot of cycling efficiency (y-axis, %) as a function of cycles (x-axis) for the Li∥Zn—Sn of FIG. 8.
Figure 10B:
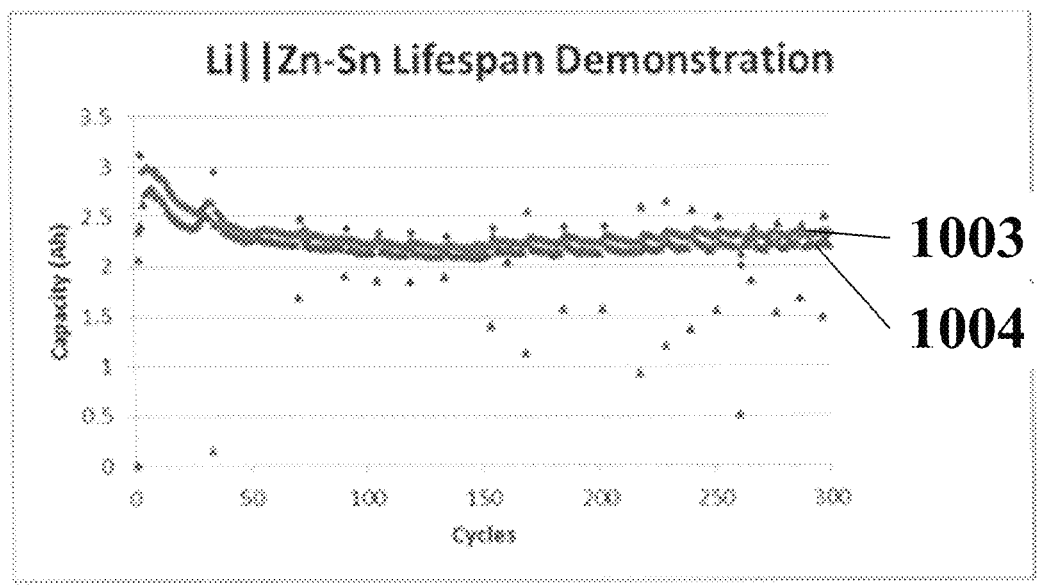
FIG. 10B is a plot of cell capacity (y-axis, Ah) as a function of cycles (x-axis) for the Li∥Zn—Sn of FIG. 8.

FIG. 10A is a plot of cycling efficiency (y-axis, %) as a function of cycles (x-axis) for the Li∥Zn—Sn of FIG. 8. Cell Coulombic efficiency 1001 and energy efficiency 1002 are shown as a function of cycles. FIG. 10B is a plot of cell capacity (y-axis, Ah) as a function of cycles (x-axis) for the Li∥Zn—Sn of FIG. 8. Cell charge capacity 1003 and discharge capacity 1004 are shown as a function of cycles.

Example 3

In another example, a Type 2 cell comprises Na∥Zn or Na∥Zn—Sn. The cell can include a sodium salt-containing electrolyte, such as, e.g., sodium halide salt(s), sodium hydroxide salt(s), nitrites or nitrates, or such salt(s) mixed with potassium salt(s), lithium salt(s) and/or calcium salt(s). The salts can be halides, hydroxides, nitrides, nitrates, or other salt compositions. Such a cell can provide a cell voltage in a charged state of at least about 1.6 V. The Na∥Zn or Na∥Zn—Sn cell can be operated at a temperature of about 100° C. to 900° C. (depending on the composition of the salt and/or positive electrode material). In such a case, the negative electrode, electrolyte and positive electrode can be in a liquid (or molten) state. Na metal and Na-containing salts are more thermodynamically compatible with a wide variety of cell housings and sealant materials.

In some cases, during operation of Na∥Zn or Na∥Zn—Sn cell, Na and Zn can form a Na and Zn-containing intermetallic compound, $NaZn_x$, wherein 'x' is a number greater than 0. The Na and Zn-containing intermetallic compound can be an immiscible solid or liquid. In some example, 'x' is about 13. Such compound can be immiscible with Na, which can enable it to be removed (e.g., drip off) from the negative electrode and aid in minimizing, if not preventing, cell voltage degradation through dilution of the negative electrode with Zn.

In an example operation of a Na∥Zn cell, Zn metal or Zn-rich alloys may accumulate and subsequently drip off (or otherwise flow out of) the negative current collector and fall through the electrolyte, and subsequently re-alloy with the cathode, returning the system to its initial or substantially initial state and recovering the anode. This may be applicable to other chemistries, such as, for example, Li∥Zn based chemistries.

In some situations, during the operation of a Li∥Zn cell comprising a salt (e.g., chlorine-containing electrolyte), a solid or semi-solid compound may form in the electrolyte, such as, for example, at a location that is adjacent to, in proximity to, or near the cathode. The solid or semi-solid compound may be a Zn-halide compound (e.g., Li, Zn and Cl-containing salt). The solid or semi-solid compound may be solid or semi-solid at an operating temperature of the cell. In some situations, one or more operating parameters of the cell (e.g., composition, operating temperature) are selected such that the solid or semi-solid compound is porous, which may permit electrolyte components (e.g., Li cations) to migrate from the negative current collector through the solid or semi-solid compound to the positive current collector, and vice versa.

Systems, apparatuses and/or methods of the present disclosure may be combined with or modified by other systems, apparatuses and/or methods, such as, for example, those described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), and U.S. Patent Publication No. 2012/0104990 ("ALKALI METAL ION BATTERY WITH BIMETALLIC ELECTRODE"), each of which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. An energy storage device comprising at least one electrochemical cell, said at least one electrochemical cell comprising:
   (a) a negative current collector;
   (b) a negative electrode in electrical communication with said negative current collector, wherein said negative electrode comprises an alkali or alkaline earth metal, and wherein said negative electrode is in a liquid state at an operating temperature of at least about 100° C.;
   (c) an electrolyte in electrical communication with said negative electrode, wherein upon discharge said electrolyte provides charged species of said alkali or alkaline earth metal, and wherein said electrolyte is in a liquid state at said operating temperature;
   (d) a positive electrode in electrical communication with said electrolyte, wherein said positive electrode comprises one or more Group 12 elements, and wherein said positive electrode is in a liquid state at said operating temperature; and
   (e) a positive current collector in electrical communication with said positive electrode;
   wherein said energy storage device has an open circuit voltage greater than about 1 Volt (V) after at least about 100 charge/discharge cycles.

2. The energy storage device of claim 1, wherein said alkali or alkaline earth metal is lithium, sodium, potassium, magnesium or any combination thereof.

3. The energy storage device of claim 1, wherein said one or more Group 12 elements include zinc.

4. The energy storage device of claim 1, wherein said positive electrode further comprises one or more of tin, lead, bismuth, antimony, tellurium and selenium.

5. The energy storage device of claim 1, wherein said electrolyte comprises NaF, NaCl, NaBr, NaI, LiF, LiCl, LiBr, LiI, KF, KCl, KBr, KI, $CaF_2$, $CaCl_2$, $CaBr_2$, $CaI_2$, or any combination thereof.

6. The energy storage device of claim 1, wherein said operating temperature is at least about 250° C.

7. The energy storage device of claim 1, wherein, in a partially or fully charged state of said at least one electrochemical cell, said electrolyte comprises cations of said one or more Group 12 elements dissolved therein.

8. The energy storage device of claim 1, wherein upon discharge said charged species of said alkali or alkaline earth metal dissolves into said electrolyte.

9. The energy storage device of claim 1, wherein said open circuit voltage is greater than about 1 V in a charged state.

10. The energy storage device of claim 1, wherein said open circuit voltage is greater than about 1.5 V after at least about 100 charge/discharge cycles.

11. The energy storage device of claim 1, wherein said open circuit voltage is greater than about 2 V after at least about 100 charge/discharge cycles.

12. The energy storage device of claim 1, wherein said energy storage device exhibits said open circuit voltage in a fully or partially charged state.

13. An energy storage device comprising at least one electrochemical cell, said at least one electrochemical cell comprising:
  (a) a negative electrode that, in a charged state of said at least one electrochemical cell, comprises an alkali or alkaline earth metal, wherein said negative electrode is in a liquid state at an operating temperature of at least about 100° C.;
  (b) an electrolyte in electrical communication with said negative electrode, wherein upon charge of said at least one electrochemical cell, said electrolyte provides charged species of said alkali or alkaline earth metal, and wherein said electrolyte is in a liquid state at said operating temperature; and
  (c) a positive electrode in electrical communication with said electrolyte, wherein said positive electrode comprises a metal or metalloid, and wherein said positive electrode is in a liquid state at said operating temperature;
  wherein (i) in a discharged state of said at least one electrochemical cell, said positive electrode does not contain said alkali or alkaline earth metal, or (ii) in a partially or fully charged state of said at least one electrochemical cell, said electrolyte comprises cations of said metal or metalloid dissolved therein,
  wherein said at least one electrochemical cell exhibits an open circuit voltage greater than about 1 Volt (V) after at least about 100 charge/discharge cycles.

14. The energy storage device of claim 13, wherein (i) in a discharged state of said at least one electrochemical cell, said positive electrode does not contain said alkali or alkaline earth metal, and (ii) in a partially or fully charged state of said at least one electrochemical cell, said electrolyte comprises cations of said metal or metalloid dissolved therein.

15. The energy storage device of claim 13, wherein said at least one electrochemical cell exhibits an open circuit voltage greater than about 1.5 V after at least about 100 charge/discharge cycles.

16. The energy storage device of claim 15, wherein said at least one electrochemical cell exhibits an open circuit voltage greater than about 2 V after at least about 100 charge/discharge cycles.

17. The energy storage device of claim 13, wherein said positive electrode comprises a metal that is a transition metal.

18. The energy storage device of claim 13, wherein said positive electrode comprises a Group 12 element.

19. The energy storage device of claim 13, wherein said positive electrode comprises one or more of tin, lead, bismuth, antimony, tellurium and selenium.

20. The energy storage device of claim 13, wherein said energy storage device has an energy storage capacity of at least about 30 kWh.

21. The energy storage device of claim 13, wherein said energy storage device has an energy storage capacity less than about 30 kWh.

22. The energy storage device of claim 13, wherein said operating temperature is at least about 400° C.

23. The energy storage device of claim 13, wherein in a discharged state, said alkali or alkaline earth metal of said negative electrode is in said electrolyte.

24. The energy storage device of claim 13, wherein (i) in a discharged state of said at least one electrochemical cell, said negative electrode and said positive electrode do not contain said alkali or alkaline earth metal.

25. The energy storage device of claim 13, wherein said operating temperature is at least about 250° C.

26. The energy storage device of claim 13, wherein upon charge of said at least one electrochemical cell, said charged species of said alkali or alkaline earth metal is extracted from said electrolyte.

27. The energy storage device of claim 13, wherein said open circuit voltage is greater than about 1 V in a charged state.

28. The energy storage device of claim 13, wherein said energy storage device exhibits said open circuit voltage in a fully or partially charged state.

29. A method for charging an energy storage device, comprising:
  (a) providing an energy storage device comprising at least one electrochemical cell, comprising:
    (i) a negative electrode comprising an alkali or alkaline earth metal, wherein said negative electrode is in a liquid state at an operating temperature of at least about 100° C.;
    (ii) an electrolyte adjacent to said negative electrode, wherein said electrolyte comprises a salt of said alkali or alkaline earth metal, and wherein said electrolyte is in a liquid state at said operating temperature; and
    (iii) a positive electrode adjacent to said electrolyte, wherein said positive electrode comprises a metal or metalloid other than an alkali metal, and wherein said positive electrode is in a liquid state at said operating temperature; and
  (b) charging said at least one electrochemical cell through an external load that is electrically coupled to said energy storage device to attain a voltage from about 1 Volt (V) to 3 V after at least about 100 charge/discharge cycles at said operating temperature, wherein upon charging, cations of said metal or metalloid are dissolved into said electrolyte.

30. The method of claim 29, wherein upon charging said at least one electrochemical cell, said metal or metalloid is reversibly directed into said electrolyte.

31. The method of claim 29, wherein upon charging said at least one electrochemical cell, said alkali metal is directed from said electrolyte into said negative electrode.

32. The method of claim 29, wherein said operating temperature is at least about 200° C.

33. The method of claim 29, wherein said operating temperature is at least about 300° C.

34. The method of claim 29, wherein, in a discharged state, said negative electrode has a stoichiometric deficiency of said alkali or alkaline earth metal with respect to said metal or metalloid of said positive electrode.

35. The method of claim 29, wherein said voltage is from about 1.5 V to 2.5 V.

36. The method of claim 29, wherein said positive electrode comprises at least one transition metal.

37. The method of claim 36, wherein said positive electrode further comprises tin.

38. The method of claim 29, wherein said positive electrode comprises at least one Group 12 element.

39. The energy storage device of claim 29, wherein said operating temperature is at least about 250° C.

40. The method of claim 29, wherein said voltage is from about 1 V to 2.5 V.

41. The energy storage device of claim 29, wherein said voltage is at least about 1.5 V in a charged state.

42. The energy storage device of claim 29, wherein said voltage is at least about 2 V in a charged state.

* * * * *